United States Patent
Malina et al.

(10) Patent No.: US 9,857,995 B1
(45) Date of Patent: Jan. 2, 2018

(54) DATA STORAGE DEVICE AND METHOD PROVIDING NON-VOLATILE MEMORY BUFFER FOR REAL-TIME PRIMARY NON-VOLATILE MEMORY PROTECTION

(71) Applicant: Western Digital Technologies, Inc., Irvine, CA (US)

(72) Inventors: James N. Malina, Irvine, CA (US); Totok Sulistiomono Sujanto, Singapore (SG); Li Dong, Singapore (SG)

(73) Assignee: Western Digital Technologies, Inc., Irvine, CA (US)

( * ) Notice: Subject to any disclaimer, the term of this patent is extended or adjusted under 35 U.S.C. 154(b) by 197 days.

(21) Appl. No.: 14/642,597

(22) Filed: Mar. 9, 2015

(51) Int. Cl.
G06F 3/06 (2006.01)

(52) U.S. Cl.
CPC .......... G06F 3/0619 (2013.01); G06F 3/0656 (2013.01); G06F 3/0685 (2013.01); *G06F 2003/0691* (2013.01)

(58) Field of Classification Search
CPC ................. G06F 3/068; G06F 12/0246; G06F 2212/205; G06F 2212/217; G06F 3/06–3/08; G06F 12/00–12/16
See application file for complete search history.

(56) References Cited

U.S. PATENT DOCUMENTS

| | | | |
|---|---|---|---|
| 6,181,500 B1 * | 1/2001 | Serrano | G11B 20/18 360/53 |
| 6,856,556 B1 | 2/2005 | Hajeck | |
| 6,986,021 B2 | 1/2006 | Master et al. | |
| 7,126,857 B2 | 10/2006 | Hajeck | |
| 7,320,062 B2 | 1/2008 | Master et al. | |
| 7,430,136 B2 | 9/2008 | Merry, Jr. et al. | |
| 7,447,807 B1 | 11/2008 | Merry et al. | |
| 7,502,256 B2 | 3/2009 | Merry, Jr. et al. | |
| 7,509,441 B1 | 3/2009 | Merry et al. | |
| 7,596,643 B2 | 9/2009 | Merry, Jr. et al. | |
| 7,653,778 B2 | 1/2010 | Merry, Jr. et al. | |
| 7,685,337 B2 | 3/2010 | Merry, Jr. et al. | |
| 7,685,338 B2 | 3/2010 | Merry, Jr. et al. | |
| 7,685,374 B2 | 3/2010 | Diggs et al. | |
| 7,733,712 B1 | 6/2010 | Walston et al. | |
| 7,765,373 B1 | 7/2010 | Merry et al. | |
| 7,898,855 B2 | 3/2011 | Merry, Jr. et al. | |
| 7,912,991 B1 | 3/2011 | Merry et al. | |
| 7,936,603 B2 | 5/2011 | Merry, Jr. et al. | |
| 7,962,792 B2 | 6/2011 | Diggs et al. | |
| 8,078,918 B2 | 12/2011 | Diggs et al. | |
| 8,090,899 B1 | 1/2012 | Syu | |

(Continued)

*Primary Examiner* — Nicholas Simonetti
(74) *Attorney, Agent, or Firm* — Foley & Lardner LLP

(57) ABSTRACT

A data storage device is disclosed comprising a volatile memory, a primary and a secondary non-volatile memory (NVM), and control circuitry coupled to the volatile memory and the primary and secondary NVM and configured to write first data to the volatile memory, write the first data from the volatile memory to the secondary NVM before writing the first data to the primary NVM, attempt to write the first data to the primary NVM, wherein, during the attempt to write the first data to the primary NVM, after a portion of the first data has been successfully written to the primary NVM, a corresponding portion of the first data is released from the secondary NVM.

31 Claims, 12 Drawing Sheets

(56) References Cited

U.S. PATENT DOCUMENTS

| | | |
|---|---|---|
| 8,095,851 B2 | 1/2012 | Diggs et al. |
| 8,108,692 B1 | 1/2012 | Merry et al. |
| 8,122,185 B2 | 2/2012 | Merry, Jr. et al. |
| 8,127,048 B1 | 2/2012 | Merry et al. |
| 8,135,903 B1 | 3/2012 | Kan |
| 8,151,020 B2 | 4/2012 | Merry, Jr. et al. |
| 8,161,227 B1 | 4/2012 | Diggs et al. |
| 8,166,245 B2 | 4/2012 | Diggs et al. |
| 8,243,525 B1 | 8/2012 | Kan |
| 8,250,339 B2 | 8/2012 | Master et al. |
| 8,254,172 B1 | 8/2012 | Kan |
| 8,261,012 B2 | 9/2012 | Kan |
| 8,296,625 B2 | 10/2012 | Diggs et al. |
| 8,312,207 B2 | 11/2012 | Merry, Jr. et al. |
| 8,316,176 B1 | 11/2012 | Phan et al. |
| 8,341,339 B1 | 12/2012 | Boyle et al. |
| 8,375,151 B1 | 2/2013 | Kan |
| 8,392,635 B2 | 3/2013 | Booth et al. |
| 8,397,107 B1 | 3/2013 | Syu et al. |
| 8,407,449 B1 | 3/2013 | Colon et al. |
| 8,412,915 B2 | 4/2013 | Master et al. |
| 8,423,722 B1 | 4/2013 | Deforest et al. |
| 8,433,858 B1 | 4/2013 | Diggs et al. |
| 8,443,167 B1 | 5/2013 | Fallone et al. |
| 8,447,920 B1 | 5/2013 | Syu |
| 8,458,435 B1 | 6/2013 | Rainey, III et al. |
| 8,478,930 B1 | 7/2013 | Syu |
| 8,489,854 B1 | 7/2013 | Colon et al. |
| 8,503,237 B1 | 8/2013 | Horn |
| 8,521,972 B1 | 8/2013 | Boyle et al. |
| 8,549,236 B2 | 10/2013 | Diggs et al. |
| 8,583,835 B1 | 11/2013 | Kan |
| 8,601,311 B2 | 12/2013 | Horn |
| 8,601,313 B1 | 12/2013 | Horn |
| 8,612,669 B1 | 12/2013 | Syu et al. |
| 8,612,804 B1 | 12/2013 | Kang et al. |
| 8,615,681 B2 | 12/2013 | Horn |
| 8,638,602 B1 | 1/2014 | Horn |
| 8,639,872 B1 | 1/2014 | Boyle et al. |
| 8,683,113 B2 | 3/2014 | Abasto et al. |
| 8,700,834 B2 | 4/2014 | Horn et al. |
| 8,700,950 B1 | 4/2014 | Syu |
| 8,700,951 B1 | 4/2014 | Call et al. |
| 8,706,985 B1 | 4/2014 | Boyle et al. |
| 8,707,104 B1 | 4/2014 | Jean |
| 8,713,066 B1 | 4/2014 | Lo et al. |
| 8,713,357 B1 | 4/2014 | Jean et al. |
| 8,719,531 B2 | 5/2014 | Strange et al. |
| 8,724,422 B1 | 5/2014 | Agness et al. |
| 8,725,931 B1 | 5/2014 | Kang |
| 8,745,277 B2 | 6/2014 | Kan |
| 8,751,728 B1 | 6/2014 | Syu et al. |
| 8,769,190 B1 | 7/2014 | Syu et al. |
| 8,769,232 B2 | 7/2014 | Suryabudi et al. |
| 8,775,720 B1 | 7/2014 | Meyer et al. |
| 8,782,327 B1 | 7/2014 | Kang et al. |
| 8,788,778 B1 | 7/2014 | Boyle |
| 8,788,779 B1 | 7/2014 | Horn |
| 8,788,880 B1 | 7/2014 | Gosla et al. |
| 8,793,429 B1 | 7/2014 | Call et al. |
| 8,892,520 B2 * | 11/2014 | Yim ............... G06F 3/0605 707/654 |
| 2003/0102889 A1 | 6/2003 | Master et al. |
| 2006/0031660 A1 | 2/2006 | Master et al. |
| 2006/0067123 A1 * | 3/2006 | Jigour ............ G11C 7/1045 365/185.05 |
| 2007/0255898 A1 * | 11/2007 | Nishide ........... G06F 12/0866 711/113 |
| 2008/0024899 A1 * | 1/2008 | Chu ............... G06F 3/0614 360/69 |
| 2008/0098203 A1 | 4/2008 | Master et al. |
| 2009/0216910 A1 * | 8/2009 | Duchesneau ...... G06F 9/5072 709/250 |
| 2009/0313482 A1 | 12/2009 | Master et al. |
| 2010/0174849 A1 | 7/2010 | Walston et al. |
| 2010/0250793 A1 | 9/2010 | Syu |
| 2011/0099323 A1 | 4/2011 | Syu |
| 2011/0283049 A1 | 11/2011 | Kang et al. |
| 2012/0260020 A1 | 10/2012 | Suryabudi et al. |
| 2012/0278531 A1 | 11/2012 | Horn |
| 2012/0284460 A1 | 11/2012 | Guda |
| 2012/0317397 A1 | 12/2012 | Master et al. |
| 2012/0324191 A1 | 12/2012 | Strange et al. |
| 2013/0086307 A1 * | 4/2013 | Kurashige ........ G06F 12/0866 711/103 |
| 2013/0111474 A1 | 5/2013 | Agarwal et al. |
| 2013/0132638 A1 | 5/2013 | Horn et al. |
| 2013/0145106 A1 | 6/2013 | Kan |
| 2013/0275653 A1 * | 10/2013 | Ranade ............ G06F 3/0605 711/103 |
| 2013/0290793 A1 | 10/2013 | Booth et al. |
| 2014/0006362 A1 * | 1/2014 | Noronha .......... G06F 3/0641 707/692 |
| 2014/0059405 A1 | 2/2014 | Syu et al. |
| 2014/0101369 A1 | 4/2014 | Tomlin et al. |
| 2014/0115427 A1 | 4/2014 | Lu |
| 2014/0133220 A1 | 5/2014 | Danilak et al. |
| 2014/0136753 A1 | 5/2014 | Tomlin et al. |
| 2014/0149826 A1 | 5/2014 | Lu et al. |
| 2014/0157078 A1 | 6/2014 | Danilak et al. |
| 2014/0181432 A1 | 6/2014 | Horn |
| 2014/0195564 A1 | 7/2014 | Talagala et al. |
| 2014/0223255 A1 | 8/2014 | Lu et al. |
| 2015/0243369 A1 * | 8/2015 | Zhang ............ G11C 29/56008 702/117 |

* cited by examiner

US 9,857,995 B1

DATA STORAGE DEVICE AND METHOD PROVIDING NON-VOLATILE MEMORY BUFFER FOR REAL-TIME PRIMARY NON-VOLATILE MEMORY PROTECTION

BACKGROUND

Data storage devices (such as hard disk drives (HDDs), solid-state hybrid drives (SSHDs), or solid-state drives (SSDs)) comprise non-volatile memory (NVM), which serves as primary storage location for data received from a host, and volatile memory, which serves as a temporary storage location for host data. In an HDD, the primary data storage location is generally provided by rotating magnetic media (one or more disks), whereas in an SSD, non-volatile solid-state memory (e.g., NAND) provides the primary data storage location. In HDDs, SSHDs, and SSDs, the temporary storage location is typically provided by DRAM.

When data is received from the host in a data storage device, it is temporarily stored in the volatile memory (e.g., DRAM) before being written to the primary storage location (e.g., a disk). Once written from the temporary storage location to the primary storage location, the host data is safe from loss resulting from an interruption (either intentional or unexpected) in power supplied to the data storage device. However, while the host data resides in the temporary storage location (e.g., DRAM), it is susceptible to loss from an interruption in supplied power.

DETAILED DESCRIPTION

Some embodiments of the invention are directed to providing a secondary NVM in a data storage device (e.g., an HDD, SSHD, or SSD) for providing real-time data protection for primary NVM. In certain embodiments of the invention, the secondary NVM comprises a different type of media than the primary NVM, and wherein the secondary NVM is configured to enable host data to be written from volatile memory (e.g., DRAM) to the primary and secondary NVM in real time at substantially the same data rate. In one embodiment, the primary NVM comprises rotating magnetic media (one or more disks) and the secondary NVM comprises Magnetoresistive random-access memory (MRAM). In the description below, for simplicity, a simplified data storage device example is used to illustrate the concepts. However, certain embodiments of the invention are not limited to a single or simplified device example, and can be applied to storage devices/systems with tiers of primary and secondary NVM storage. For example, the primary storage can be an array of HDDs or rotating magnetic media assemblies, or an array of SSDs or banks of solid-state memory.

In an embodiment of the invention, the secondary NVM comprises a plurality of memory banks that are configured as a buffer capable of providing real-time protection for one or more sectors of data (i.e., data sectors) written from the volatile memory to the primary NVM. In one embodiment, the buffer is configured as a write-through buffer. In another embodiment, the buffer is configured as a write-behind buffer.

In an embodiment of the invention, the secondary NVM comprises two memory banks that are configured as a ping-pong buffer. In various embodiments of the invention, the ping-pong buffer may be configured as a write-through buffer or a write-behind buffer. In one embodiment, the secondary NVM comprises a plurality of memory banks that are configured as a write-through buffer and a write-behind buffer. In one embodiment, the data storage device comprises control circuitry configured to detect an unsafe write environment (e.g., a shock or high vibration environment) and configure the secondary NVM as a write-behind buffer. In an embodiment, data is written from the volatile memory to the secondary NVM before the data is written to the primary NVM. In one embodiment, data is written from the volatile memory to the secondary NVM and the primary NVM concurrently.

Various embodiments of the invention will now be described. These embodiments are presented by way of example only, and are not intended to limit the scope of the invention. Various omissions, substitutions and changes in the form of the methods and devices described herein may be made without departing from the spirit of the invention. To illustrate some of the embodiments, reference will now be made to the figures.

Figure 1A:
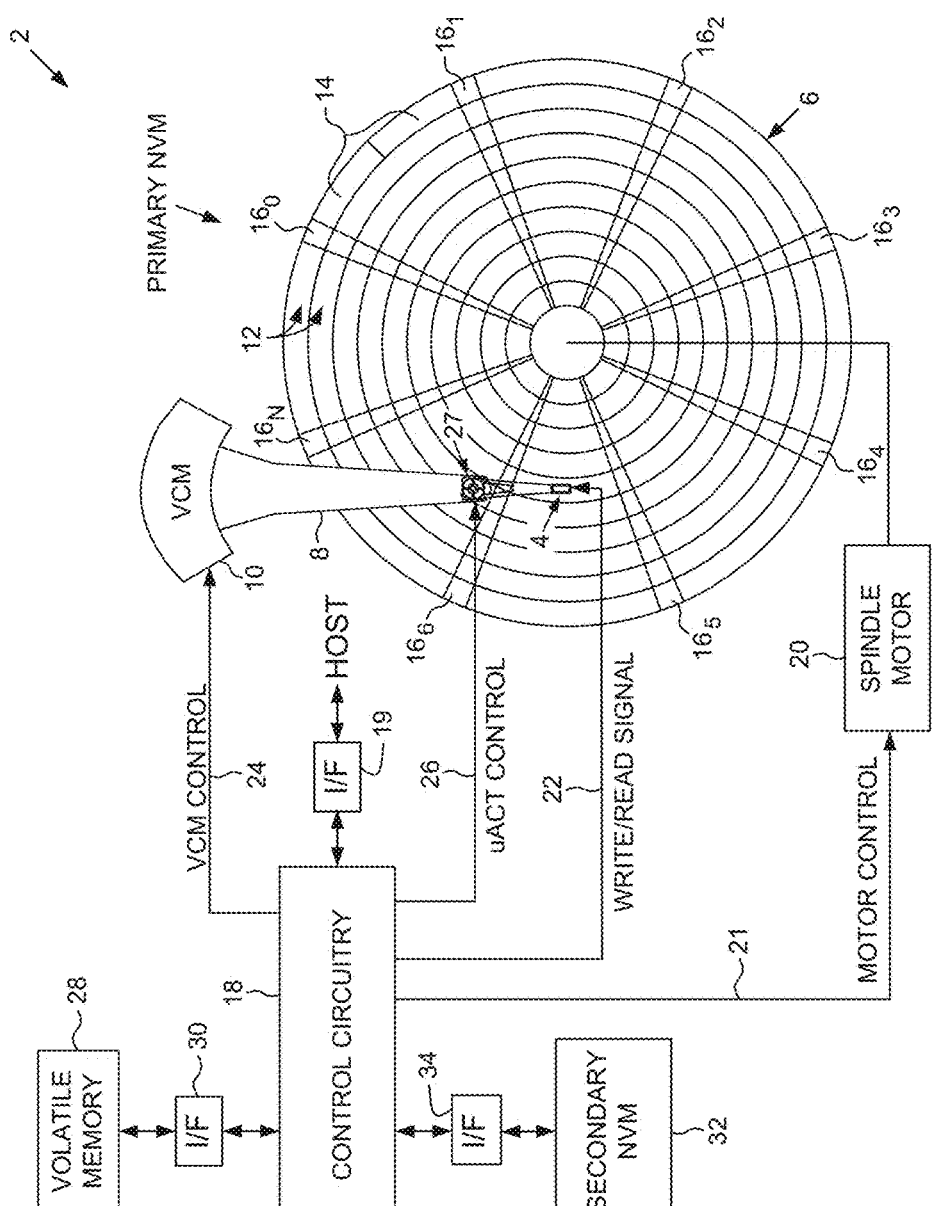
FIG. 1A shows a data storage device (in communication with a host) according to an embodiment of the present invention comprising a control circuitry in communication with a primary non-volatile memory (NVM) comprising a disk, a secondary NVM, and volatile memory.

FIG. 1A shows a data storage device 2 (e.g., a hard disk drive (HDD) or a solid-state hybrid drive (SSHD)) according to an embodiment of the invention comprising a head 4 actuated radially over a disk 6 by an actuator arm 8, and a voice coil motor (VCM) 10 configured to rotate the actuator arm 8 about a pivot. In the embodiment shown in FIG. 1A, the disk 6 (i.e., rotating magnetic media) functions as the primary NVM. In another embodiment, the primary NVM may comprise a different type of media, such as NAND flash, or a combination of media such as rotating magnetic media and NAND flash, as in certain storage devices such as SSHDs. In the embodiment in FIG. 1A, the disk 6 comprises a plurality of data tracks 12, wherein each data track 12 comprises a plurality of sectors 14, which can be addressed and used by a host for reading and writing data. The disk 6 further comprises a plurality of embedded servo sectors $16_0$-$16_N$ that define the data tracks 12. In an embodiment, the primary NVM (e.g., the disk 6) supports a data throughput rate (also referred to simply as a "data rate") of 200 megabytes per second (MB/s) or higher.

In the embodiment shown in FIG. 1A, the data storage device 2 further comprises control circuitry 18 configured to actuate the head 4 over the disk 6 in response to the servo sectors $16_0$-$16_N$. In one embodiment, the control circuitry 18 is situated in a System On a Chip (SOC) in the data storage device 2. In an embodiment (such as the embodiment shown in FIG. 1A) in which the primary NVM comprises rotating magnetic media (e.g., one or more disks 6), interface 19 may comprise a Serial ATA (SATA), Serial Attached SCSI (SAS), or a USB interface. In an embodiment in which the primary NVM comprises solid state memory, interface 19 may comprise, a SATA, SATA Express, SAS, USB, PCI Express (PCIe), or NVM Express (NVMe) interface, or other type of interface that is compatible with solid state memory.

In the embodiment in FIG. 1A, the disk 6 is rotated by a spindle motor 20 at a rotational speed that is controlled by the control circuitry 18, for example, a motor driver of the control circuitry 18, via motor control signal 21. In the embodiment of FIG. 1A, the control circuitry 18 processes a read signal 22 emanating from the head 4 to demodulate the servo sectors $16_0$-$16_N$ and generate a position error signal (PES) representing an error between the actual position of the head 4 and a target position relative to a target data track. The control circuitry 18 filters the PES using a suitable compensation filter to generate a control signal 24 applied to VCM 10, which rotates actuator arm 8 about the pivot in order to actuate the head 4 radially over the disk 6 in a direction that reduces the PES.

In the embodiment in FIG. 1A, the control circuitry 18 also generates a control signal 26 applied to a microactuator 27 in order to actuate the head 4 over the disk 6 in fine movements. Any suitable microactuator 27 may be employed in various embodiments of the invention, such as a piezoelectric actuator. In addition, the microactuator 27 may actuate the head 4 over the disk 6 in any suitable manner, such as by actuating a suspension relative to the actuator arm, or actuating a slider relative to the suspension. The servo sectors $16_0$-$16_N$ may comprise any suitable head position information, such as a track address for coarse positioning and servo bursts for fine positioning. The servo bursts may comprise any suitable pattern, such as an amplitude-based servo pattern or a phase-based servo pattern.

In the embodiment shown in FIG. 1A, the data storage device 2 further comprises volatile memory 28, which serves as a temporary data storage location. The volatile memory 28 can comprise, for example, dynamic random access memory (DRAM), static random access memory (SDRAM), or other non-persistent type of memory. In various embodiments of the invention, the volatile memory 28 functions as a write buffer to temporarily store data from a host before it is written to the primary NVM. In the embodiment in FIG. 1A, the data storage device 2 further comprises interface 30, which is utilized by the control circuitry 18 to communicate with the volatile memory 28. Interface 30 may be, for example, a Double Date Rate (DDR), DDR type three (DDR3), or DDR type four (DDR4) interface. For example, interface 30 may have a data rate of 600 megabytes MB/s or higher.

In the embodiment shown in FIG. 1A, the data storage device 2 further comprises a secondary NVM 32, which serves as a persistent data storage location (data stored in the secondary NVM 32 can survive a power interruption or power loss) for providing real-time data protection for data that is written to the primary NVM. In embodiments of the invention, the secondary NVM comprises a different type of media that the primary NVM. In one embodiment, the secondary NVM 32 comprises MRAM, which uses a method of storing data bits using magnetic charges instead of the electrical charges used by DRAM. MRAM has an advantage over other types of NVM of being able to be written repeatedly without suffering any substantial wear out. In other embodiments, the secondary NVM 32 may comprise, for example, Chalcogenide RAM (C-RAM), correlated electron RAM (CeRAM), Phase Change Memory (PC-RAM or PRAM), Programmable Metallization Cell RAM (PMC-RAM or PMCm), Ovonic Unified Memory (OUM), Resistance RAM (ReRAM), NAND memory, NOR memory, EEPROM, Ferroelectric Memory (FeRAM), or other discrete NVM (non-volatile memory) chips.

In the embodiment shown in FIG. 1A, the data storage device 2 further comprises interface 34, which is utilized by the control circuitry 18 to communicate with the secondary NVM 32. In embodiments of the invention, the control circuitry 18 is configured to write data to the secondary NVM 32 in real time from the volatile memory 28 while writing data to the primary NVM (e.g., the disk 6). In embodiments of the invention, interface 34 has a slower data rate than the rate at which the control circuitry 18 reads data from and writes data to the primary NVM (e.g., the disk 6). In an embodiment, interface 34 comprises a serial peripheral interface (SPI) (or any serial or parallel interface) and may have a data rate of 1-20 MB/s, for example.

In the embodiment in FIG. 1A, the secondary NVM 32 further comprises one or more banks of memory (memory banks), wherein each memory bank comprises one or more memory chips. For example, as shown the embodiment in FIG. 2, the secondary NVM 32 comprises memory banks 1 and 2 and each memory bank comprises memory chips 1-4. As shown in the embodiment in FIG. 2, memory chips 1-4 in each memory bank are coupled together in a parallel configuration so as to increase the data rate of the memory bank. For example, if one memory chip (e.g., an MRAM chip) has a data rate of 50 MB/s and a memory bank comprises four memory chips, the memory bank would have a data rate of 200 MB/s. Also, in various embodiments of the invention, the number of memory banks in the secondary NVM 32 may be selected to achieve a desired data rate for the secondary NVM 32.

Figure 2:
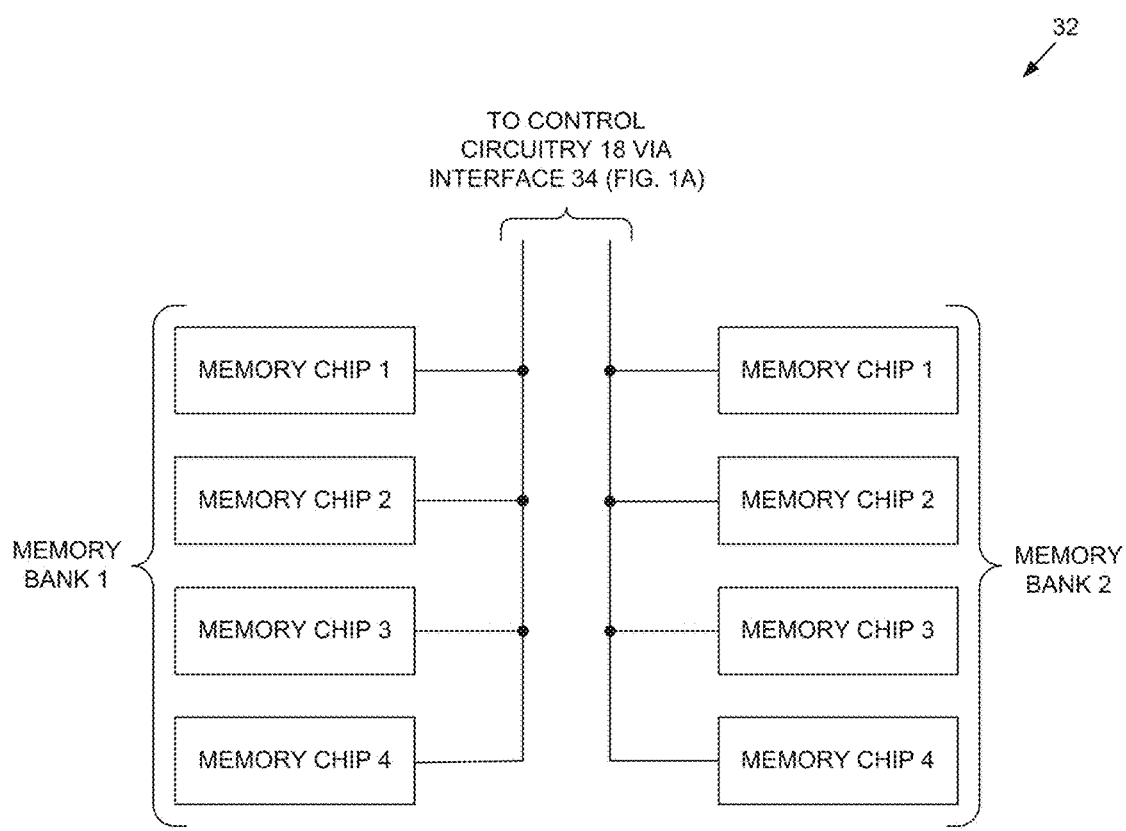
FIG. 2 shows a secondary NVM comprising first and second memory banks each comprising a plurality of memory chips coupled together in parallel according to an embodiment of the invention.

In the embodiment shown in FIG. 2, memory banks 1 and 2 may be configured as a "ping-pong" buffer, in which memory bank 1 is used to store incoming data writes while memory bank 2 is being released to accept new data writes. Once memory bank 2 has been released, it can accept new data writes while memory bank 1 undergoes a releasing process, and so forth. In an embodiment in which memory banks 1 and 2 are configured as a ping-pong buffer, the sustained data throughput of the secondary NVM 32 is increased. Also, the date throughput (data rate) of the secondary NVM 32 may also be increased by increasing the number of memory banks in the secondary NVM 32. In various embodiments, the secondary NVM 32 may be configured as a write-through buffer or a write-behind buffer. In one embodiment, the secondary NVM 32 may be configured as a write-through buffer and a write-behind buffer. The write-through buffer is further discussed in the embodiment shown in FIG. 3 and the write-behind buffer is further discussed in the embodiment shown in FIG. 4.

Figure 1B:
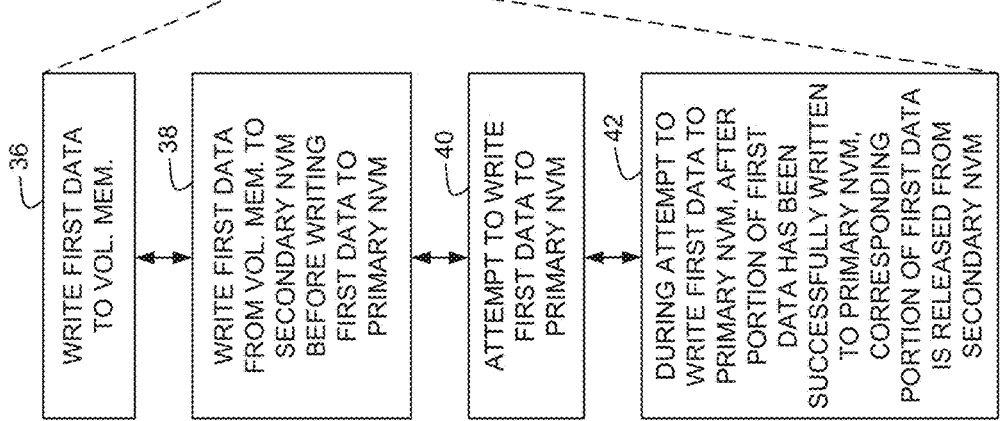
FIG. 1B is a flow diagram according to an embodiment of the invention wherein first data is written from volatile memory to secondary NVM before writing the first data to primary NVM, and during an attempt to write the first data to the primary NVM, after a portion of the first data has been written to the primary NVM, a corresponding portion of the first data is released from the secondary NVM.

In the embodiment shown in FIG. 1A, the control circuitry 18 is configured to execute the flow diagram of FIG. 1B, wherein first data is written to the volatile memory 28 (block 36). For example, the first data may be received via a write command from the host. However, the first data may also be received from a source other than the host, such as a source internal to the data storage device 2. As shown in FIG. 1B, the first data is written from the volatile memory 28 to the secondary NVM 32 before the first data is written to the primary NVM (e.g., the disk 6) (block 38). In embodiments of the invention, the control circuitry 18 writes the first data to the secondary NVM 32 in real time. After writing the first data to the secondary NVM 32, the control circuitry 18 attempts to write the first data to the primary NVM (block 40). During the attempt to write the first data to the primary NVM, after a portion of the first data has been successfully written to the primary NVM, a corresponding portion of the first data is released from the secondary NVM 32 (block 42).

Figure 3:
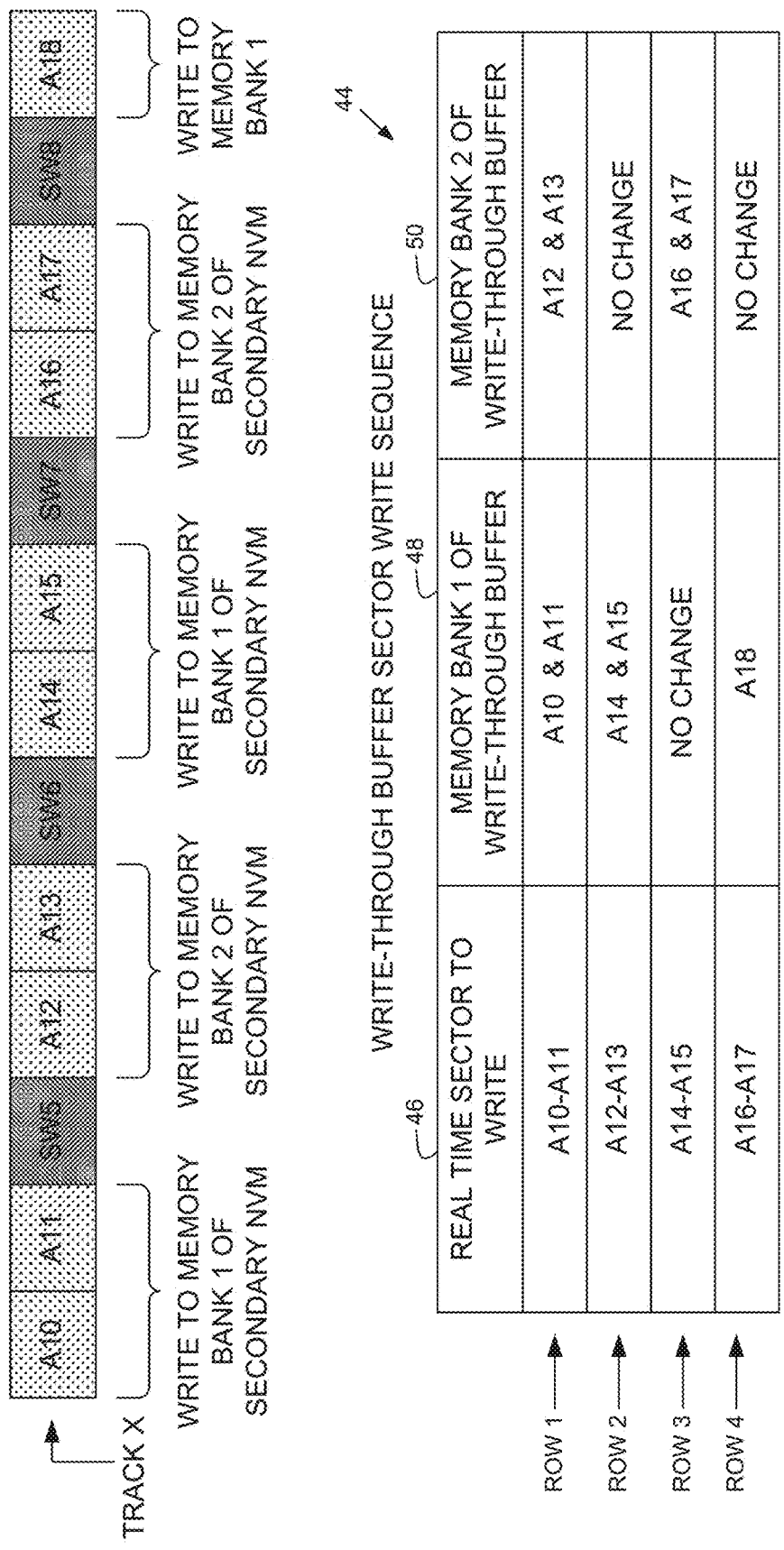
FIG. 3 shows an embodiment of the invention in which the secondary NVM comprises first and second memory banks configured as a write-through buffer.

FIG. 3 shows an embodiment of the invention in which the secondary NVM 32 (FIG. 1A) comprises memory banks 1 and 2 configured as a write-through buffer and in which the primary NVM comprises a disk 6 (FIG. 1A) comprising data track X. In an embodiment in which the data rate of the secondary NVM 32 is greater than the rate at which data is written to the primary NVM, the secondary NVM 32 may provide a write-through buffer using only a single memory bank. As shown in the embodiment in FIG. 3, data track X comprises sectors A10-A18 and servo wedges (SW) 5-8, wherein sectors A10-A18 are data sectors (i.e., they comprise written data). In data track 1, two successive sectors are separated by a SW and each SW provides information that is usable (by the control circuitry 18 (FIG. 1A)) to confirm that data in the two preceding successive sectors has been successfully written to the disk 6. Thus, for example, SW5 is used to confirm that data in sectors A10 and A11 has been successfully written to the disk 6, SW6 is used to confirm that data in sectors A12 and A13 has been successfully written to the disk 6, and so forth. Although only two sectors are situated between adjacent servo wedges in the embodiment shown in FIG. 3, more than two sectors may be situated between adjacent servo wedges in another embodiment.

In the embodiment in FIG. 3, table 44 indicates a sector write sequence for a write-through buffer comprising memory banks 1 and 2 in the secondary NVM (FIG. 1A). In table 44, column 46 shows sectors in data track X that are to receive write data from the volatile memory 28 (FIG. 1A) (which functions as a write buffer) in real-time, column 48 shows sector data that is written to memory bank 1 of the write-through buffer, and column 50 shows sector data that is written to memory bank 2 of the write-through buffer.

The operation of the write-through buffer comprising memory banks 1 and 2 in the secondary NVM 32 (FIG. 1A) will now be discussed according to the embodiment shown in FIG. 3. The rows 1-4 denote the status/action taken at different points on a timeline. In row 1 of table 44, when data is written to sectors A10 and A11 in data track X in real time, the same sector data is written in real time to memory bank 1 of the write-through buffer (configured in the secondary NVM 32 (FIG. 1A)) from the volatile memory 28 (FIG. 1A) and data for sectors A12 and A13 is written to memory bank 2 of the write-through buffer from the volatile memory 28 in real time. In the embodiment shown in FIG. 3, memory bank 1 forms the "ping" portion of the write-through buffer and memory bank 2 forms the "pong" portion. After the data has been successfully written to sectors A10 and A11 in data track X of the disk 6 (FIG. 1A) (as confirmed by SW5 in data track X), the data for sectors A10 and A11 is released from memory bank 1 to enable it to receive data for sectors A14 and A15. To achieve ping-pong buffering in the embodiment in FIG. 3, the data rate for memory banks 1 and 2 may each be substantially equal to one-half the data rate of the primary NVM (the disk 6 in the embodiment in FIG. 3). In one embodiment, ping-pong buffering is achieved for memory banks 1 and 2 with the data rate for each memory bank being slightly high than one-half the data rate of the primary NVM (e.g., a disk 6) to add margin for pre-access setup (switching time).

In row 2 of table 44 in the embodiment in FIG. 3, when data is written to sectors A12 and A13 in data track X in real time (from the volatile memory 28 (FIG. 1A)), data for sectors A14 and A15 is written in real time to memory bank 1 of the write-through buffer. After the data has been successfully written to sectors A12 and A13 in data track X of the disk 6 (FIG. 1A) (as confirmed by SW6), the data for sectors A12 and A13 in memory bank 2 is released to enable memory bank 2 to receive data for sectors A16 and A17. In row 3 of table 44, when data is written to sectors A14 and A15 in data track X in real time, data for sectors A16 and A17 is written in real time to memory bank 2 of the write-through buffer. After the data has been successful written to sectors A14 and A15 (as confirmed by SW7), the data for sectors A14 and A15 in memory bank 1 is released to enable memory bank 1 to receive data for sector A18. In row 4 of table 44 in the embodiment in FIG. 3, when data is written in real time to sectors A16 and A17 in data track X, data for sector A18 is written in real time to memory bank 1 of the write-through buffer. After the data has been successful written to sectors A16 and A17 (as confirmed by SW8), the data for sectors A16 and A17 in memory bank 2 is released to enable memory bank 2 to receive the next sector data.

In the embodiment shown in FIG. 3, by holding data in a memory bank (e.g., memory bank 1 or 2 in the secondary NVM 32 (FIG. 1A) for sectors in data track X until the data has been successfully written with data track X, the secondary NVM 32 performs write-through buffering by protecting the data in the sectors in data track X from corruption that may occur if an unexpected power loss occurs while the data is being written to the disk 6 (the primary NVM in the embodiment in FIG. 3). If, for example, data in the sectors in data track X is corrupted as a result of an unexpected power loss, the data that is preserved in one of the memory banks may be used to replace the corrupted data in the sectors in data track X. In the embodiment shown in FIG. 3, the secondary NVM 32 (FIG. 1A) can preserve two data sectors situated between adjacent servo wedges through an unexpected power failure so as to prevent possible data corruption. By increasing the number of memory chips in each memory bank, various embodiments of the invention can provide protection for a correspondingly greater number of data sectors of a data track on the disk 6 (FIG. 1A).

Figure 4:
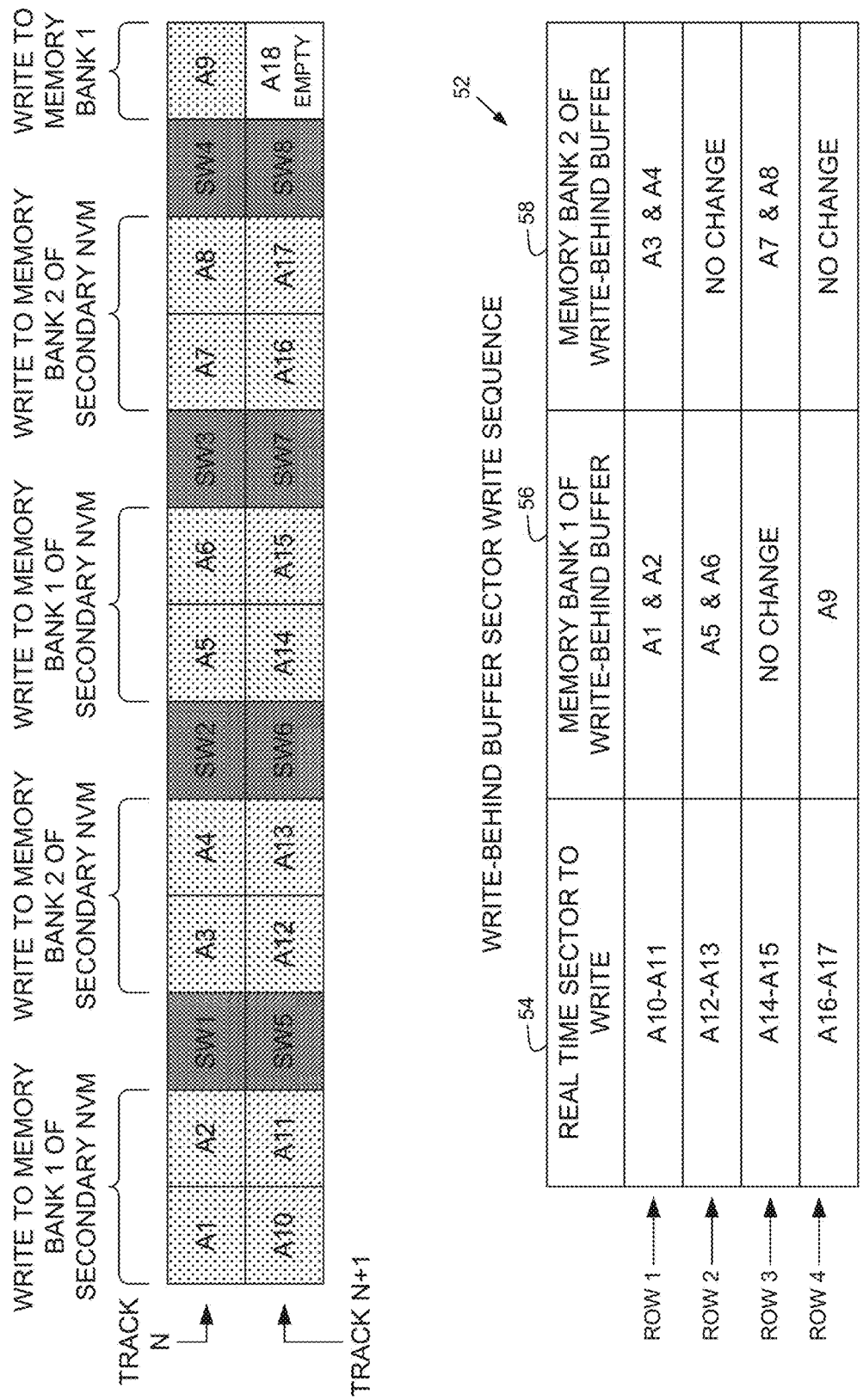
FIG. 4 shows an embodiment of the invention in which the secondary NVM comprises first and second memory banks configured as a write-behind buffer.

FIG. 4 shows an embodiment of the invention in which the secondary NVM 32 (FIG. 1A) comprises memory banks 1 and 2 configured as a ping-pong write-behind buffer, and in which the primary NVM comprises a disk 6 (FIG. 1A) comprising adjacent data tracks N and N+1. In an embodiment in which the data rate of the secondary NVM 32 is greater than the rate at which data is written to the primary NVM, the secondary NVM 32 may provide a write-behind buffer using only a single memory bank. As shown in the embodiment in FIG. 4, data track N comprises sectors A1-A9 and SW (servo wedges) 1-4, in which sectors A1-A9 are data sectors, and track N+1 comprises sectors A10-A17 and SW5-SW8, in which sectors A10-A17 are data sectors and sector A18 is empty (it comprises no written data). In data tracks N and N+1, two successive sectors are separated by a servo wedge and each servo wedge Y provides information that is used to confirm when data in the preceding data sectors situated between servo wedges Y−1 and Y has been successfully written to the disk 6.

In the embodiment shown in FIG. 4, table 52 indicates a sector write sequence for a write-behind buffer comprising memory banks 1 and 2 in the secondary NVM 32. In table 52, column 54 shows sectors in data track N+1 in which to write data to from the volatile memory 28 in real time, column 56 shows sector data that is written to memory bank 1 of the write-behind buffer, and column 58 shows sector data that is written to memory bank 2 of the write-behind buffer. In table 52, each of rows 1-4 show the data content of memory banks 1 and 2 when data is written to the sectors shown in column 54.

The operation of the write-behind buffer comprising memory banks 1 and 2 in the secondary NVM 32 will now be discussed with respect to table 52 in FIG. 4. In the embodiment shown in FIG. 4, data tracks N and N+1 are written into the volatile memory 28 (FIG. 1A) before they are written to the secondary and primary NVM. For example, in situations where tracks are written sequentially (e.g., in Shingled Magnetic Recording), data tracks N and N+1 may be written in consecutive order, so that data track N is written first, followed by data track N+1. In that scenario, data for data track N may already reside in the volatile memory 28 while data for data track N+1 is to be written to the primary NVM. Using the write-behind scheme described below, data for data track N is written to the secondary NVM and a prior track's data may be recovered in case the process of writing data to a current track corrupts the prior track's data, even in the case of power loss.

Referring in FIG. 4, in row 1, when data is being written in real time to sectors A10 and A11 in data track N+1, memory bank 1 contains the sector data that has been written in sectors A1 and A2 in data track N from the volatile memory 28 and memory bank 2 contains the sector data that has been written in sectors A3 and A4 in data track N from the volatile memory 28. After the data has been successfully written to sectors A10 and A11 in track N+1 of the disk 6 from the volatile memory 28 (as confirmed by SW5 in data track N+1) without causing corruption to data in adjacent sectors A1 and A2 in data track N, the data for sectors A1 and A2 is released from memory bank 1 to allow sector data for sectors A5 and A6 in data track N to be written to memory bank 1 from the volatile memory 28.

In row 2 of table 52 in FIG. 4, when data is being written in real time to sectors A12 and A13 in data track N+1 from the volatile memory 28, memory bank 1 contains the sector data in sectors A5 and A6 (which was written to memory bank 1 from the volatile memory 28 after the sector data for sectors A1 and A2 was released), and memory bank 2 contains the sector data in sectors A3 and A4 in data track N. After the data has been successfully written to sectors A12 and A13 in track N+1 from the volatile memory 28 (as confirmed by SW6 in data track N+1) without causing corruption to data in adjacent sectors A3 and A4 in data track N, the data for sectors A3 and A4 is released from memory bank 2 to allow data for sectors A7 and A8 in data track N to be written to memory bank 2 from the volatile memory 28.

In row 3 of table 52 in FIG. 4, when data is being written in real time to sectors A14 and A15 in data track N+1 from the volatile memory 28, memory bank 1 contains the data in sectors A5 and A6 in data track N that was written from the volatile memory 28 and memory bank 2 contains the data in sectors A7 and A8 (which was written to memory bank 2 from the volatile memory 28 after the data from sectors A3 and A4 was released). After the data has been successfully written to sectors A14 and A15 in data track N+1 from the volatile memory 28 (as confirmed by SW7) without causing corruption to data in adjacent sectors A5 and A6 in data track N, the data for sectors A5 and A6 is released from memory bank 1 to allow sector data from sector A9 in data track N to be written to memory bank 1 from the volatile memory 28.

In row 4 of table 52 in FIG. 4, when data is being written in real-time to sectors A16 and A17 in data track N+1 from the volatile memory 28, memory bank 1 contains the data in sector A9 (which was written to memory bank 1 from the volatile memory 28 after the data from sectors A5 and A6 was released), and memory bank 2 contains the data in sectors A7 and A8 in data track N that was written from the volatile memory 28. After the data has been successfully written to sectors A16 and A17 in data track N+1 (as confirmed by SW8) without causing corruption to data in adjacent sectors A7 and A8 in data track N, the data for sectors A7 and A8 is released from memory bank 2 to allow it to receive other sector data from the volatile memory 28.

In the embodiment in FIG. 4, by holding data in a memory bank (e.g., memory bank 1 or 2 in the secondary NVM 32 (FIG. 1A)) for sectors in data track N until data has been successfully written in adjacent sectors in data track N+1 without corrupting the data in the sectors in data track N, the secondary NVM 32 performs write-behind buffering by protecting the data in the sectors in data track N from corruption that may occur if a shock or high vibration event occurs while the data is being written in the adjacent sectors in track N+1. Note: Corruption may also occur from squeeze to death or other possible reasons. If, for example, data in the sectors in data track N is corrupted while data is being written in the adjacent sectors in data track N+1, the data (for the sectors in track N) that is stored in the memory bank can be used to replace the corrupted data in the sectors in track N. In one embodiment, the control circuitry 18 can be configured to detect an unsafe write environment (such as a shock or high vibration environment), and configure the secondary NVM as a write-behind buffer to provide protection for data in sectors in track N while data is being written to adjacent sectors in data track N+1.

In the embodiment in FIG. 4, the secondary NVM provides a ping-pong write-behind buffer by alternating the use of memory banks 1 and 2 to store data from sectors in data track N before data is written to adjacent sectors in data track N+1. In the embodiment in FIG. 4, only data for two sectors is stored at one time in either memory bank 1 or 2. In another embodiment, an appropriate number of memory chips are provided in memory banks 1 and 2 to allow data for more than two sectors to be stored in either memory bank 1 or 2. To achieve ping-pong buffering in the embodiment in FIG. 4, the data rate for memory banks 1 and 2 may each be substantially equal to one-half the data rate of the primary NVM (the disk 6 in the embodiment in FIG. 4). In one embodiment, ping-pong buffering is achieved for memory banks 1 and 2 with the data rate for each memory bank being slightly high than one-half the data rate of the primary NVM (e.g., a disk 6) to add margin for "pre-access setup time," which refers to an amount of time required for a memory bank to get ready to receive sector data.

Figure 5:
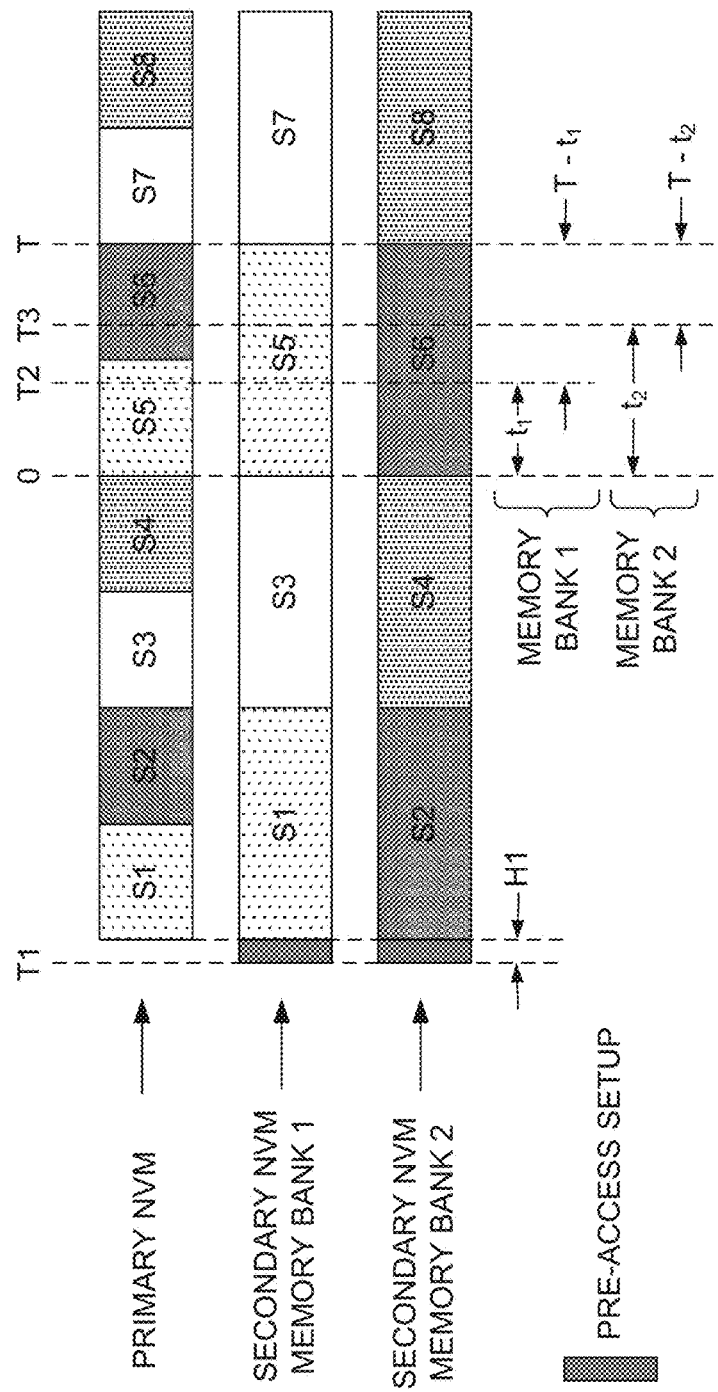
FIG. 5 shows a diagram of a concurrent access timing mode for a primary and a secondary NVM according to an embodiment of the invention.

FIG. 5 shows a diagram of a concurrent access timing mode for a primary and a secondary NVM according to an embodiment of the invention. In the embodiment shown in FIG. 5, the primary NVM comprises a disk 6 (FIG. 1A) comprising sectors S1-S8, wherein the sectors S1-S8 are receiving write data from a volatile memory 28 (FIG. 1A) that functions as a write buffer. The primary NVM may have a write data rate of approximately 200 MB/s, for example. In the embodiment shown in FIG. 5, the secondary NVM 32 (FIG. 1A) comprises memory banks 1 and 2, in which data that is being written to sectors S1, S3, S5, and S7 in the primary NVM is also being written to memory bank 1 and in which data that is being written to sectors S2, S4, S6, and S8 of the primary NVM is also being written to memory bank 2. For example, each memory bank may have a write data rate that is slightly higher than one-half of the data rate of the primary NVM to account for pre-access setup time. In an embodiment of the invention, the data rate of the primary NVM is substantially equal to the data rate of the secondary NVM 32. In an embodiment of the invention, memory banks 1 and 2 each comprise a plurality of MRAM chips. In the embodiment shown in FIG. 5, the secondary NVM 32 is configured as a ping-pong buffer in which data is alternately written to memory banks 1 and 2.

The operation of the concurrent access timing mode (hereinafter "concurrent mode") will now be discussed according to the embodiment of the invention shown in FIG. 5. At time T1, pre-access setup of memory banks 1 and 2 begins and lasts for duration H1. After pre-access setup of memory banks 1 and 2 is completed, concurrent writing of data from the volatile memory 28 (write buffer) to the primary NVM (the disk 6 in the embodiment in FIG. 5) and memory banks 1 and 2 begins at time T1+H1. In the embodiment shown in FIG. 5, data for sector S1 of the primary NVM is written in real time (from the volatile memory 28) to sector S1 in the primary NVM and to memory bank 1 of the secondary NVM 32, data for sector S2 of the primary NVM is written in real time to sector S2 in the primary NVM and to memory bank 2 of the secondary NVM 32, data for sector S3 of the primary NVM is written in real time to sector S3 in the primary NVM and to memory bank 1 of the secondary NVM 32, and so forth.

In the embodiment in FIG. 5, in case an unexpected power loss occurs during writing of data to either memory bank 1 or memory bank 2 of the secondary NVM 32, a particular amount of time (and corresponding amount of reserve power) is required to ensure that the write in progress to memory bank 1 or 2 is completed to save the corresponding data being written to primary NVM, since it is assumed that the write in progress to the primary NVM will not be successfully completed. After power loss, data saved to memory bank 1 or 2 can be used in a recovery process to complete the interrupted write to the primary NVM. In this application, a "holding time" is defined as the amount of time required to complete a write in progress to either memory bank 1 or memory bank 2 of the secondary NVM 32. In regards to the holding time, it is assumed that it takes substantially the same amount of time to write the same amount of data to either memory bank 1 or 2, and it takes substantially twice as long to write the same amount of data to either member bank 1 or 2 compared to the primary NVM (e.g., the disk 6).

To determine the worst case holding time (the longest holding time) for memory bank 1, assume that an unexpected power loss occurs at T2 at which time data is being written in real time to sector S5 in the primary NVM and concurrently being written to memory bank 1 in the secondary NVM 32. As shown in the embodiment in FIG. 5, the write to sector S5 in the primary NVM and the write to memory bank 1 start at the "0" line in FIG. 5, and the write to memory bank 1 (for the sector S5 data) ends at time T. In the worst case, power loss (T2) occurs at the beginning of the data write to sector S5 in the primary NVM, which coincides with the beginning of the write of the same data to memory bank 1. As shown in the embodiment in FIG. 5, the worst case holding time for memory bank 1 is T, as to allow the completion of writing of the S5 data to bank 1 to preserve S5 data over the power loss.

To determine the worst case holding time for memory bank 2, assume that the unexpected power loss occurs at T3 when data is being written in real time to S6 in the primary NVM and concurrently being written to memory bank 2. As shown in the embodiment in FIG. 5, the write to memory bank 2 of data for sector S6 in the primary NVM begins at the "0" line in FIG. 5 and ends at time T and the write to sector S6 begins at time T/2 and ends at time T. In the worst case, T3 occurs at the beginning of the write to sector S6 in the primary NVM, which coincides with a point at which the write to memory bank 2 is half completed. Thus the worst case holding time for memory bank 2 is T/2, to allow for S6 data to be completely written in the secondary NVM.

It is noted that the same holding time for memory bank 1 or 2 would be obtained by using a sector other than S5 or S6, if during the writing of data to that sector in the primary NVM, data was also being written to memory bank 1 or 2, respectively.

Assuming that the actual occurrence of T2 or T3 is unknown but follows a uniform distribution, the overall average holding time for secondary NVM 32 to complete writing data that is to be protected for the concurrent mode may be determined by the following equation, in which $t_1$ denotes the amount of time between a power loss and the beginning of a primary NVM write of sector data and a memory bank 1 write of the same sector data (labeled 0 in FIG. 5), and $t_2$ denotes the amount of time between a power loss and the beginning of a primary NVM write of sector data and a memory bank 2 write of the same sector data:

$$\frac{\int_0^{\frac{T}{2}}(T-t_1)dt_1 + \int_{\frac{T}{2}}^{T}(T-t_2)dt_2}{T} = \frac{T}{2}. \quad \text{(Equation 1)}$$

As shown in Equation 1, the average holding time is T/2. In the embodiment in FIG. 5, the time delay before the beginning of a sector data write to the primary NVM (e.g., a disk 6) after pre-access setup has begun for memory banks 1 and 2 in a ping-pong buffer configured in the concurrent mode is H1.

Figure 6:
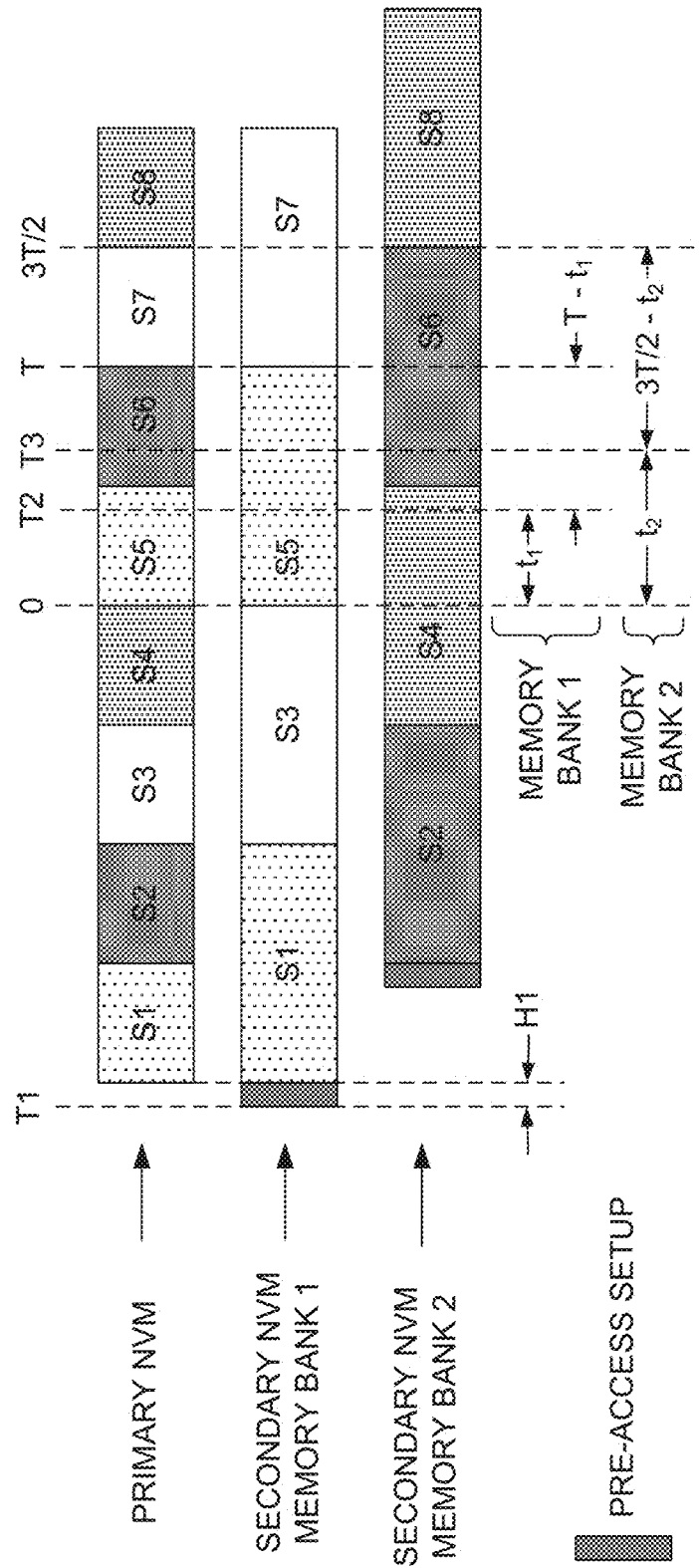
FIG. 6 shows a diagram of a start match access timing mode for a primary and a secondary NVM according to an embodiment of the invention.

FIG. 6 shows a diagram of a start match access timing mode for a primary and a secondary NVM according to an embodiment of the invention. To avoid duplicate description and preserve brevity, only the differences between the start match access timing mode (hereinafter "start match mode") in FIG. 6 and concurrent mode in FIG. 5 will be described herein. The operation of the start match mode will now be discussed according to the embodiment of the invention shown in FIG. 6, in which the secondary NVM 32 is configured as a ping-pong buffer in which data is alternately written to memory banks 1 and 2. At time T1, pre-access setup of memory bank 1 begins and lasts for duration H1. After pre-access setup of memory bank 1 is completed, real-time concurrent writing of data from the volatile memory 28 (write buffer) to the primary NVM (the disk 6 in the embodiment in FIG. 6) and memory bank 1 begins at time T1+H1. In the embodiment shown in FIG. 6, data for sector S1 of the primary NVM is written in real time concurrently (from the volatile memory 28) to sector S1 in the primary NVM and to memory bank 1 of the secondary NVM 32, data for sector S2 of the primary NVM is written concurrently to sector S2 in the primary NVM and to memory bank 2 of the secondary NVM 32, data for sector S3 of the primary NVM is written concurrently to sector S3 in the primary NVM and to memory bank 1 of the secondary NVM 32, and so forth. Thus, in the start match mode, the start of writing data to each sector in the primary NVM is concurrent with the start of writing the same data to an alternating one of memory banks 1 and 2 in the secondary NVM 32.

In the embodiment in FIG. 6, in case an unexpected power loss occurs during writing of data to either memory bank 1 or memory bank 2 of the secondary NVM 32, a holding time is required to complete a write in progress to either memory bank 1 or memory bank 2 of the secondary NVM 32. To determine the worst case holding time (the longest holding time) for memory bank 1, assume that an unexpected power loss occurs at T2 at which time data is being written to sector S5 in the primary NVM and concurrently being written to memory bank 1 in the secondary NVM 32. As shown in the embodiment in FIG. 6, the write to sector S5 in the primary NVM and the write to memory bank 1 start at the "0" line in FIG. 6, and the write to memory bank 1 (for the sector S5 data) ends at time T. In the worst case, T2 occurs at the beginning of the data write to sector S5 in the primary NVM, which coincides with the beginning of the write of the same data to memory bank 1. As shown in the embodiment in FIG. 6, the worst case holding time for memory bank 1 is T.

To determine the worst case holding time for memory bank 2, assume that the unexpected power loss occurs at T3 when data is being written to S6 in the primary NVM and concurrently being written to memory bank 2. As shown in the embodiment in FIG. 6, the write to memory bank 2 of data for sector S6 in the primary NVM begins at time T/2 in FIG. 6 and ends at time 3T/2 and the write to sector S6 begins at time T/2 and ends at time T. In the worst case, T3 occurs at the start of the write to sector S6 in the primary NVM, which coincides with the start of the write to memory bank 2. Thus the worst case holding time for memory bank 2 is equal to T (T/2 minus 3T/2).

Assuming that the actual occurrence of T2 or T3 is unknown but follows a uniform distribution, the overall average holding time for secondary NVM 32 to complete writing data that is to be protected for the start match mode may be determined by the following equation, in which $t_1$ denotes the amount of time between a power loss and the beginning of a primary NVM write of sector data and a memory bank 1 write of that sector data (labeled 0 in FIG. 6), and $t_2$ denotes the amount of time between a power loss that occurs during a primary NVM write of sector data and a memory bank 2 write of the same sector data and time 0 (labeled 0 in FIG. 6):

$$\frac{\int_0^{\frac{T}{2}}(T-t_1)dt_1 + \int_{\frac{T}{2}}^{T}\left(\frac{3T}{2}-t_2\right)dt_2}{T} = \frac{3T}{4}. \quad \text{(Equation 2)}$$

As shown in Equation 2, the average holding time is 3T/4. In the embodiment in FIG. 6, the time delay before the beginning of a sector data write to the primary NVM (e.g., a disk 6) after pre-access setup has begun for the earliest of memory banks 1 and 2 (i.e., memory bank 1) in a ping-pong buffer configured in the start match mode is H1.

Figure 7:
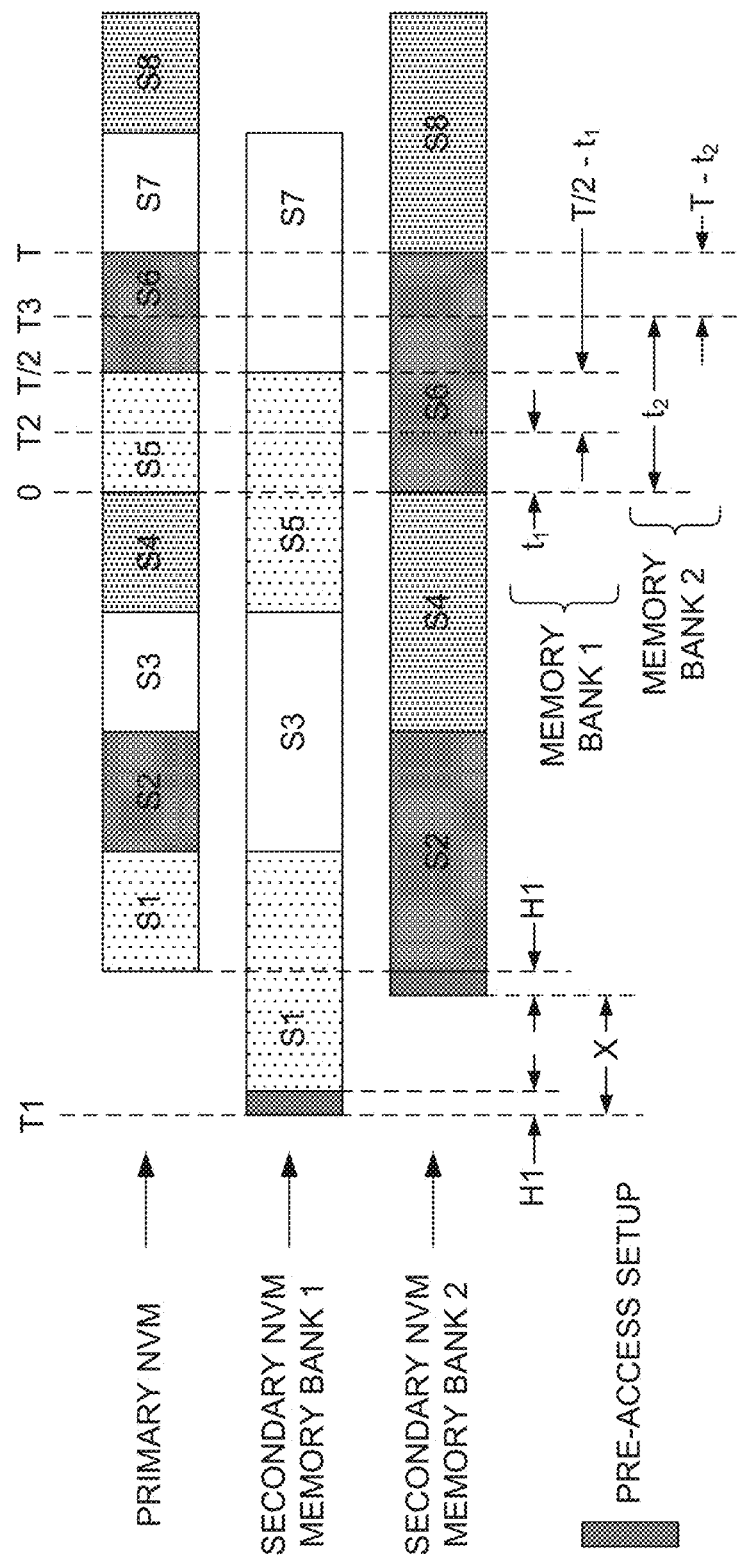
FIG. 7 shows a diagram of an end match access timing mode for a primary and a secondary NVM according to an embodiment of the invention.

FIG. 7 shows a diagram of an end match access timing mode for a primary and a secondary NVM according to an embodiment of the invention. To avoid duplicate description and preserve brevity, only the differences between the end match access timing mode (hereinafter "end match mode") in FIG. 7 and concurrent mode in FIG. 5 will be described herein, in which the secondary NVM 32 is configured as a ping-pong buffer in which data is alternately written to memory banks 1 and 2. The operation of the end match mode will now be discussed according to the embodiment of the invention shown in FIG. 7. At time T1, pre-access setup of memory bank 1 begins. After pre-access setup of memory bank 1 of the secondary NVM 32 is completed at time T1+H1, real time writing of data for sector S1 of the primary NVM (a disk 6 in the embodiment in FIG. 7) from the volatile memory 28 (write buffer) to memory bank 1 begins. At time T1+X, pre-access setup of memory bank 2 begins. After pre-access setup of memory bank 2 is completed, concurrent writing of data from the volatile memory 28 (write buffer) to the primary NVM and memory bank 2 begins at time T1+X+H1, where X is >0.

In the embodiment shown in FIG. 7, data is written in real time to sector S1 of the primary NVM and, concurrently, data for sector S2 of the primary NVM is written to memory bank 2, data is written to sector S2 of the primary NVM and, concurrently, data for sector S3 of the primary NVM is written to memory bank 1, data is written to sector S3 of the primary NVM and, concurrently, data for sector S4 of the primary NVM is written to memory bank 2, and so forth. Thus, in the end match mode, the start of writing data to each sector in the primary NVM is concurrent with the start of writing of data for the next sector of the primary NVM to an alternating one of memory banks 1 and 2 in the secondary NVM 32.

In case an unexpected power loss occurs during writing of data to either memory bank 1 or memory bank 2 of the secondary NVM 32 in the embodiment in FIG. 7, a holding time is required to complete a write in progress to either memory bank 1 or memory bank 2 of the secondary NVM 32. To determine the worst case holding time (the longest holding time) for memory bank 1, assume that an unexpected power loss occurs at T2 at which time data is being written to sector S5 in the primary NVM and, concurrently, data for sector S5 is being written to memory bank 1 in the secondary NVM 32. As shown in the embodiment in FIG. 7, the write of data for sector S5 of the primary NVM to memory bank 1 is in progress when the write of data to sector S5 in the primary NVM begins at the "0" line in FIG. 7. In the worst case, T2 occurs at the start of the data write to sector S5 in the primary NVM, which coincides with the mid-point in the write of data for sector S5 to memory bank 1. Accordingly, the worst case holding time for memory bank 1 is T/2.

To determine the worst case holding time for memory bank 2, assume that the unexpected power loss occurs at T3 when data is being written in real time to sector S6 in the primary NVM and, concurrently, data for sector S6 of the primary NVM is being written to memory bank 2. As shown in the embodiment in FIG. 7, the write to memory bank 2 of data for sector S6 in the primary NVM begins at the "0" line in FIG. 7 and ends at time T and the write to sector S6 in the primary NVM begins at time T/2 and ends at time T. In the worst case, T3 occurs at the start of the write to sector S6 in the primary NVM, which coincides with the mid-point in the write of data for sector S6 to memory bank 2. Accordingly, the worst case holding time for memory bank 2 is equal to T/2.

Assuming that the actual occurrence of T2 or T3 is unknown but follows a uniform distribution, the overall average holding time for secondary NVM 32 to complete writing data that is to be protected (written to the secondary NVM 32) for the end match mode may be determined by the following equation, in which $t_1$ denotes the amount of time between a power loss and the beginning of a primary NVM write of sector data and a memory bank 1 write of the same sector data (labeled 0 in FIG. 7), and $t_2$ denotes the amount of time between a power loss that occurs during a primary NVM write of sector data and a memory bank 2 write of the same sector data and time 0 (labeled 0 in FIG. 7):

$$\frac{\int_0^{\frac{T}{2}}\left(\frac{T}{2}-t_1\right)dt_1 + \int_{\frac{T}{2}}^T (T-t_2)dt_2}{T} = \frac{T}{4}. \quad \text{(Equation 3)}$$

As shown in Equation 3, the average holding time is T/4. In the embodiment in FIG. 6, the time delay before the beginning of a sector data write to the primary NVM (e.g., a disk 6) after pre-access setup has begun for the earliest of memory banks 1 and 2 (i.e., memory bank 1) in a ping-pong buffer configured in the end match mode is X+H1.

As discussed above, the average holding time for the concurrent, start match, and end match modes for a ping-pong buffer is T/2, 3T/4, and T/4, respectively. Thus, the start match mode provides the longest average holding time, and the end match mode provides the shortest average holding time. In one embodiment, the control circuitry 18 (FIG. 1A) is configured to configure a ping-pong buffer in the secondary NVM 32 (FIG. 1A) to bound an average holding time to a predefined limit (e.g., T/2, 3T/2, or T/4).

As discussed above, the time delay before the start of a data sector write to the primary NVM (e.g., a disk 6) after pre-access setup has begun for the earliest of memory banks 1 and 2 in the secondary NVM in a ping-pong buffer configured in the concurrent, start match, and end match modes is H1, H1, and X+H1 (where X is >0), respectively. Thus, the between the beginning of pre-access setup for the earliest of memory banks 1 and 2 and the beginning of a data sector write to the primary NVM is longest for the end match mode and the same for the concurrent and start match modes.

Figure 8:
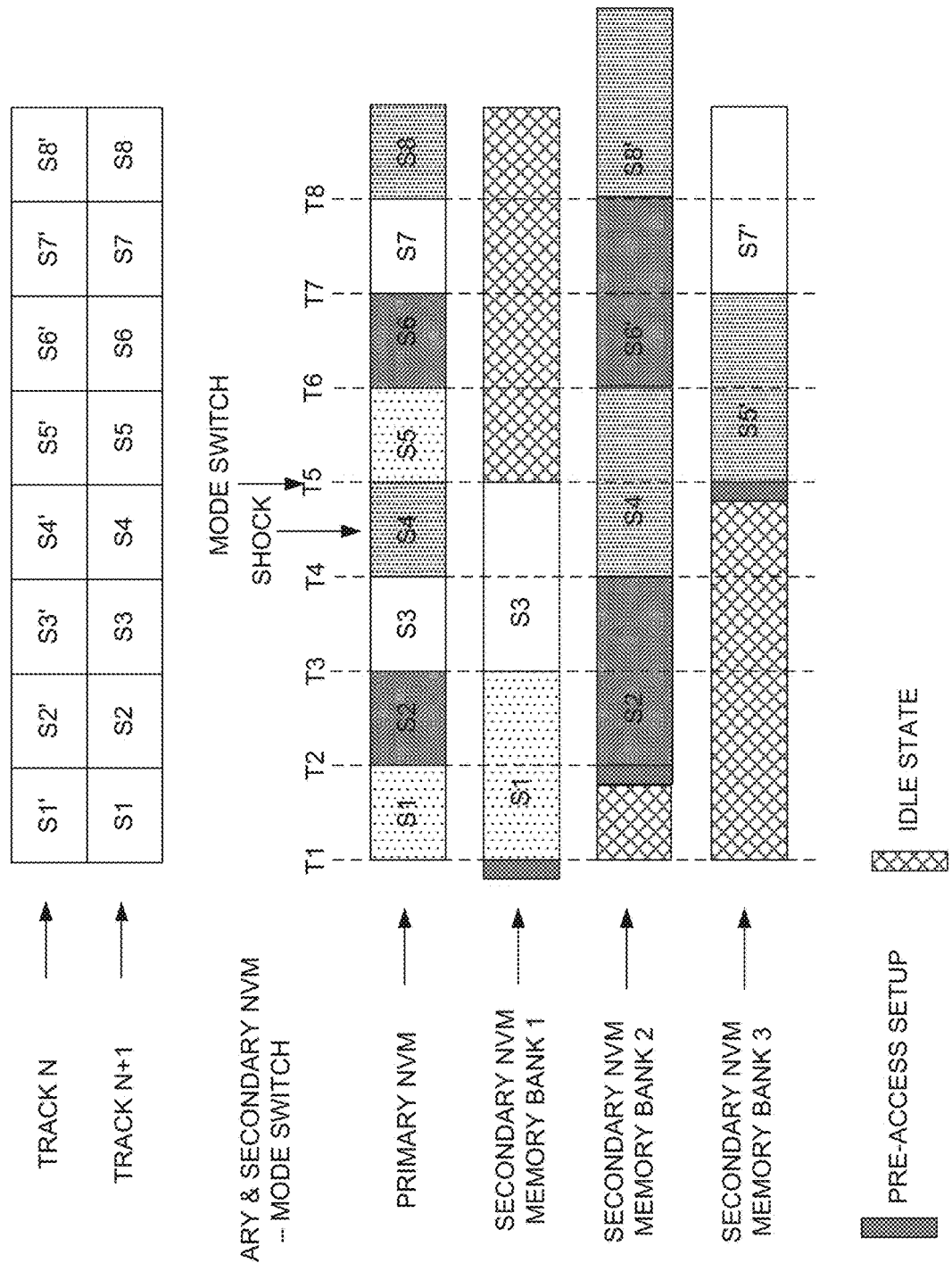
FIG. 8 shows an embodiment of the invention in which the secondary NVM provides sector-level data protection in real-time for a primary NVM and accommodates real time mode switching between write-through and write-behind modes.

FIG. 8 shows an embodiment of the invention in which the secondary NVM provides sector-level data protection in real time for a primary NVM and accommodates real time mode switching between write-through and write-behind modes. In the embodiment shown in FIG. 8, the primary NVM comprises a disk 6 (FIG. 1A) comprising a data track N comprising sectors S1-S8, a data track N+1 comprising sectors S1'-S8', and the secondary NVM 32 (FIG. 1A) comprising memory banks 1, 2, and 3. In an embodiment, each memory bank has a data rate substantially equal to one-half of the data rate of the primary NVM. In an embodiment, each memory bank has a data rate slightly greater than the data rate of the primary NVM. In one embodiment, each of memory banks 1, 2, and 3 comprise one or more MRAM chips.

The operation of the embodiment of the invention shown in FIG. 8 will now be discussed. Data track N has been previously written to the primary NVM and data track N+1 is currently being written to the primary NVM. The process begins with the secondary NVM operating in a write-through mode (as previously described in FIG. 3). At time T1, pre-access setup of memory bank 1 has been completed and real-time writing of data to sector S1 in the primary NVM from the volatile memory (write buffer) begins concurrently with writing the data for sector S1 in memory bank 1. During the beginning of the writing of data to the primary NVM and memory bank 1, memory banks 2 and 3 are in an idle state. At time T2, pre-access setup of memory bank 2 has been completed and real-time writing of data to sector S2 in the primary NVM begins concurrently with writing of the data for sector S1 in memory bank 2. At time T3, real-time writing of data to sector S3 in the primary NVM begins concurrently with writing of the data for sector S3 in memory bank 1, data for sector S2 continues to be written in memory bank 2, and memory bank 3 is in the idle state. At time T4, real-time writing of data to sector S4 in the primary NVM begins concurrently with writing of the data for sector S4 in memory bank 2, data for sector S3 continues to be written in memory bank 1, and memory bank 3 remains in the idle state.

A shock event is detected between time T4 and T5, which in the embodiment in FIG. 8, triggers a mode switch to a write-behind mode (as previously described in FIG. 4) to protect the data previously written to data track N. A shock event heightens the risk of incursion into an adjacent track so the write-behind mode in this case is meant to protect the adjacent data track N. Generally speaking, this mode switch can occur under any other circumstances deemed to put data in the adjacent track(s) at risk. Note that, due to time needed for pre-access setup, an idle memory bank 3 makes a real time mode switch possible. This is because, at time T5, both memory banks 1 and 2 are in use and cannot begin to accept data from data track N. As shown, the mode switch begins with the pre-access setup of memory bank 3, just after detection of the shock event.

At time T5, pre-access setup of memory bank 3 has been completed, real-time writing of data to sector S5 in the primary NVM begins concurrently with writing the data for sector S5' (of previously written track N, which may still reside in volatile memory) in memory bank 3, and data for sector S4 continues to be written in memory bank 2. At time T6, real time writing of data to sector S6 in the primary NVM starts concurrently with writing of the data for sector S6' in memory bank 2. Alternately, S6' can be written in memory bank 1, as it is also available but will require some pre-access setup time to exit its idle state. At time T7, real-time writing of data to sector S7 in the primary NVM begins concurrently with writing of the data for sector S7' in memory bank 3. At time T8, real-time writing of data to sector S8 in the primary NVM starts concurrently with writing the data for sector S8' in memory bank 2. Memory bank 1 enters the idle state at time T5 and serves as the idle memory bank that can accommodate the next mode switch back to the write-through mode. This switch may occur, for example, when the end of the shock event is detected. Memory bank 1 can then begin accepting sectors from data track N+1.

In the embodiment of the invention in FIG. 8, the secondary NVM 32 utilizes three memory banks to provide real-time sector-level protection for data for each of sectors S1-S8 in the primary NVM, while providing an idle memory bank to enable real time mode switching. In one embodiment, memory banks 1 and 2 are configured as a write-through buffer and the control circuitry 18 (FIG. 1A) is configured to switch the secondary NVM 32 (FIG. 1A) from the write-through buffer to a write-behind buffer, wherein the write-behind buffer comprises memory bank 3 and whichever one of memory banks 1 or 2 is released first. In another embodiment, memory banks 1 and 2 are configured as a write-behind buffer and the control circuitry 18 is configured to switch the secondary NVM 32 from the write-behind buffer to a write-through buffer, wherein the write-through buffer comprises memory bank 3 and whichever one of memory banks 1 or 2 is released first.

Figure 9:
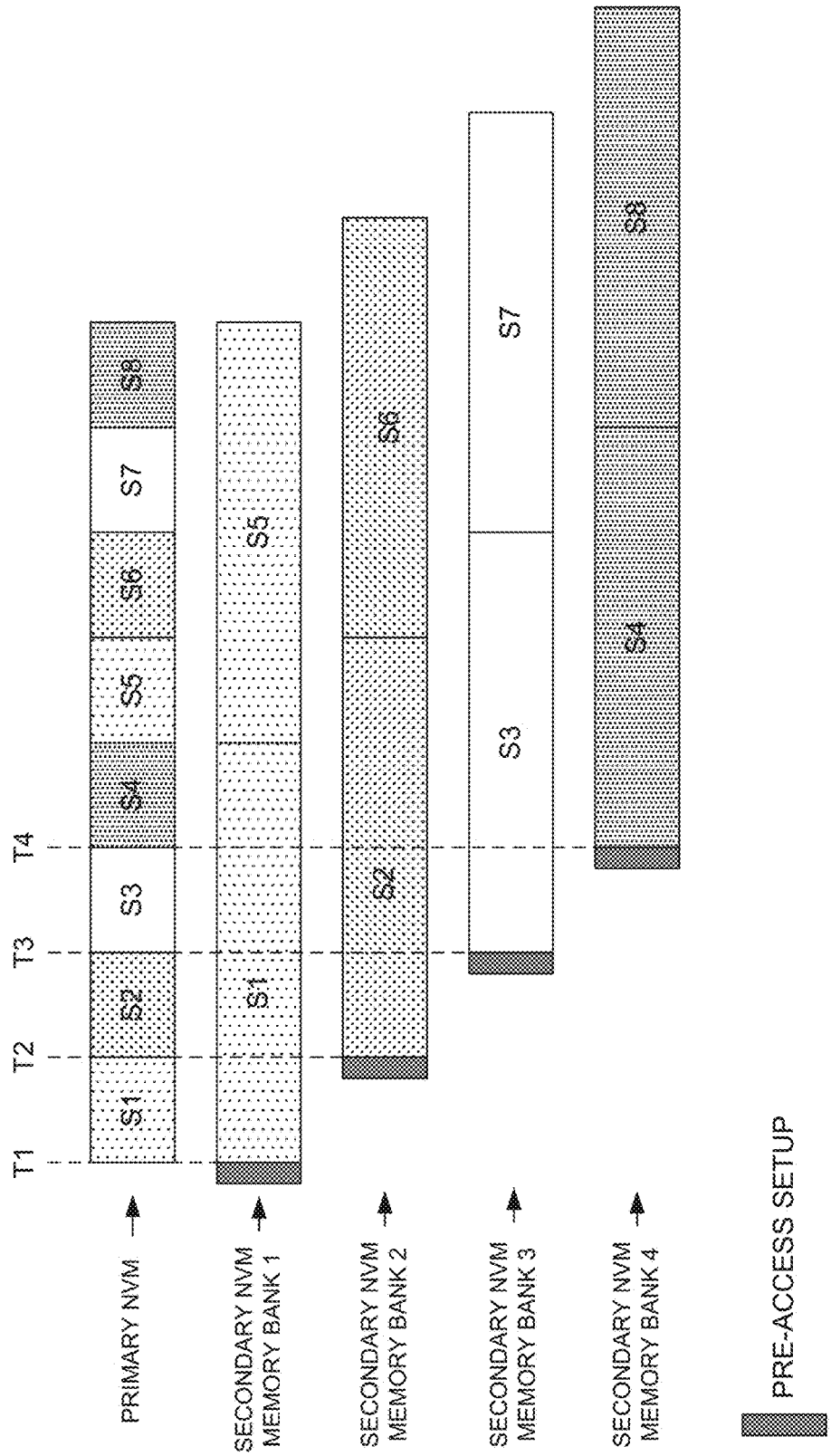
FIG. 9 shows a diagram of a start match mode for primary and secondary NVM according to an embodiment of the invention in which the secondary NVM comprises four memory banks.

FIG. 9 shows a diagram of a start match mode for primary and secondary NVM according to an embodiment of the invention. In the embodiment shown in FIG. 9, the primary NVM comprises a disk 6 comprising sectors S1-S8. In the embodiment in FIG. 9, the secondary NVM 32 comprises memory banks 1-4, wherein each memory bank comprises one or more memory chips. In one embodiment, each memory bank in the secondary NVM 32 comprises one or more MRAM chips. In an embodiment of the invention, the data rate for each of memory banks 1-4 is substantially equal to 25 percent of the data rate of the primary NVM. In one embodiment, the data rate for each of memory banks 1-4 is slightly greater than 25 percent of the data rate of the primary NVM.

The operation of the start match mode in the embodiment of the invention shown in FIG. 9 will now be discussed. At time T1, pre-access setup of memory bank 1 has been completed and real-time writing of data to sector S1 in the primary NVM from the volatile memory 28 begins concurrently with writing of the data for sector S1 in memory bank 1. At time T2, pre-access setup of memory bank 2 has been completed and real-time writing of data to sector S2 in the primary NVM from the volatile memory 28 begins concurrently with the writing of data for sector S2 in memory bank 2. At time T3, pre-access setup of memory bank 3 has been completed and real-time writing of data to sector S3 in the primary NVM from the volatile memory 28 begins concurrently with the writing of data for sector S3 in memory bank 3. At time T4, pre-access setup of memory bank 4 has been completed and real-time writing of data to sector S4 in the primary NVM from the volatile memory 28 begins concurrently with the writing of data for sector S4 in memory bank 4. The above process continues until data for sectors S5-S8 are written in real time concurrently in sectors S5-S8 in the primary NVM and in memory banks 1-4, respectively.

In the embodiment of the invention in FIG. 9, the secondary NVM 32 uses four memory banks to provide real-time data protection for each of sectors S1-S8 in the primary NVM. In the embodiment in FIG. 9, the four memory banks in the secondary NVM 32 may be configured as a write-through buffer, a write-behind buffer, or a write-through buffer and a write-behind buffer. For example, two of the four memory banks may be configured as a write-through buffer and the other two memory banks may be configured as a write-behind buffer.

Figure 10:
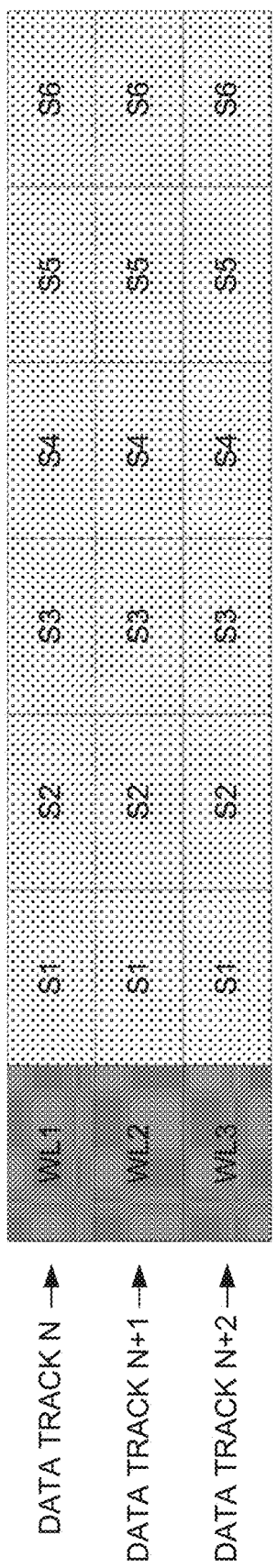
FIG. 10 shows an example of metadata in plurality of data tracks of a primary NVM for which the secondary NVM provides real-time protection according to an embodiment of the invention.

FIG. 10 shows an example of metadata in plurality of data tracks of a primary NVM for which the secondary NVM provides real-time protection according to an embodiment of the invention. As shown in FIG. 10, data track N comprises a write log 1 (WL1) sector and data sectors S1-S6, data track N+1 comprises a WL2 sector and data sectors S1-S6, and data track N+2 comprises a WL3 sector and data sectors S1-S6. In an embodiment, data tracks N, N+1, and N+2 are situated on a disk of a primary NVM, wherein the data sectors are accessed indirectly using logical block addresses (LBAs) dynamically mapped to physical block addresses (PBAs) representing the physical location of each data sector. In one embodiment, the primary NVM comprises a disk using shingled magnetic recording, wherein user data is recorded sequentially in a single direction in overlapping data tracks, and wherein a translation table is used to map LBAs to PBAs on the disk. In one embodiment, the primary NVM comprises a disk 6 (FIG. 1A) comprising a media-based cache, wherein the media-based cache comprises data tracks N, N+1, and N+2.

As shown in FIG. 10, each WL sector comprises metadata that contains LBA to PBA translation information for the previous data track's user data. For example, the WL2 sector in data track N+1 comprises metadata containing LBA to PBA translation information for data sectors S1-S6 in data track N. In an embodiment of the invention, the secondary NVM 32 (FIG. 1A) is used to store the metadata in the WL sector. The metadata stored in the secondary NVM 32 can be used to rebuild the translation table with the last known user data during an unexpected power loss recovery process, for example. In an embodiment of the invention in which the secondary NVM 32 comprisesa memory bank, wherein as data track N is written to the disk, metadata for track N is written to the memory bank, and as data track N+1 is written to the disk, the metadata for track N+1 is written to the memory bank. When the memory bank is filled up, writing to the memory bank is stopped, the metadata in the memory bank is released, and the memory bank is setup for receiving further metadata. However, the memory bank will always contain at least the metadata for the track that is currently being written to the disk.

Figure 11:
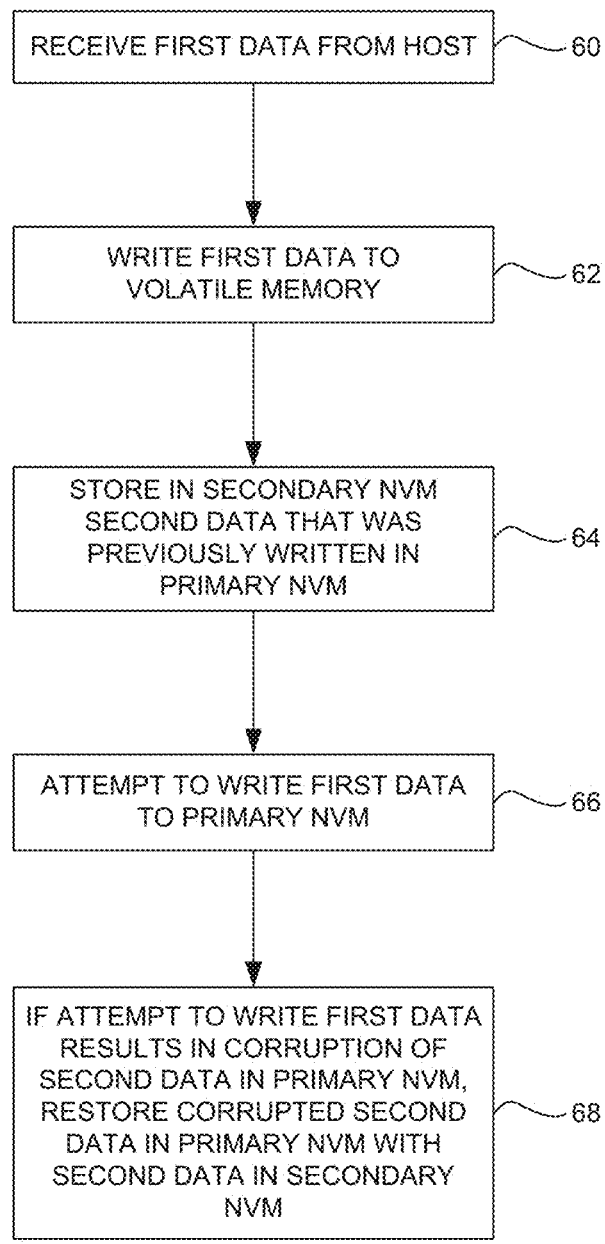
FIG. 11 is a flow diagram according to an embodiment of the invention in which second data is stored in a secondary NVM that was previously written in a primary NVM and, if an attempt to write first data results in corruption of the second data in the primary NVM, the corrupted second data is restored in the primary NVM with the second data in the secondary NVM.

FIG. 11 is a flow diagram executed by the control circuitry 18 (FIG. 1A) according to an embodiment of the invention, wherein the control circuitry 18 receives first data from a host (block 60), writes the first data to volatile memory 28 (FIG. 1A) (block 62), stores in the secondary NVM second data that was previously written in the primary NVM (block 64), and attempts to write the first data to the primary NVM (block 66). If the attempt to write the first data results in corruption of the second data in the primary NVM, the control circuitry 18 (FIG. 1A) restores the corrupted second data in the primary NVM with the second data in the secondary NVM 32.

Figure 12:
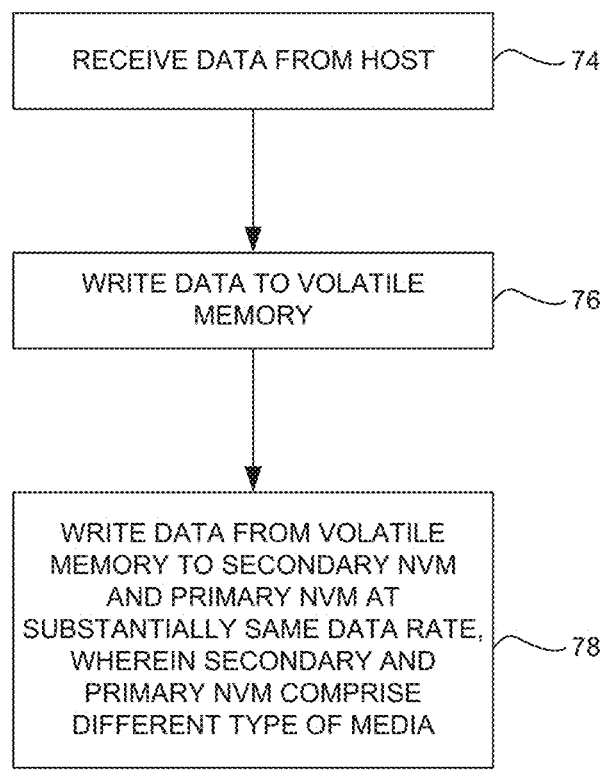
FIG. 12 is a flow diagram according to an embodiment of the invention in which data received from a host is written to volatile memory, and the data from the volatile memory is written to a secondary NVM and a primary NVM at substantially the same data rate, and wherein the secondary and the primary NVM comprise a different type of media.

FIG. 12 is a flow diagram executed by the control circuitry 18 (FIG. 1A) according to an embodiment of the invention, wherein the control circuitry 18 receives data from a host (block 74), writes the data to volatile memory 28 (FIG. 1A) (block 76), and writes the data from the volatile memory 28 to the secondary NVM 32 and the primary NVM (e.g., a disk 6 (FIG. 1A)) at substantially the same data rate, wherein the secondary and the primary NVM comprise a different type of media (block 78). In one embodiment, the secondary NVM may MRAM and the primary NVM may comprise rotating magnetic media (i.e., a disk 6 (FIG. 1A).

It is noted that the blocks (i.e., steps) in the flow diagrams in FIGS. 1B, 11, and 12 are shown in a particular order to illustrate respective embodiments of the invention. In other embodiments, the blocks in the flow diagrams in FIGS. 1B, 11 and 12 may be performed in a different order.

Any suitable control circuitry 18 FIG. 1A) may be employed in the embodiments of the invention, such as any suitable integrated circuit or circuits. For example, the control circuitry 18 may be implemented within a read channel integrated circuit, or in a component separate from the read channel, such as a disk controller, or certain blocks described above may be performed by a read channel and others by a disk controller. In one embodiment, the read channel and disk controller are implemented as separate integrated circuits, and in an alternative embodiment they are fabricated into a single integrated circuit or SOC (System On a Chip). In addition, the control circuitry may include a suitable preamp circuit implemented as a separate integrated circuit, integrated into the read channel or disk controller circuit, or integrated into an SOC.

In one embodiment, the control circuitry 18 comprises a microprocessor executing instructions, the instructions being operable to cause the microprocessor to perform the blocks in the flow diagrams described herein. The instructions may be stored in any computer-readable medium. In one embodiment, they may be stored on a non-volatile semiconductor memory external to the microprocessor, or integrated with the microprocessor in a SOC. In another embodiment, the instructions are stored on the disk 6 (FIG. 1A) and read into a volatile memory 28 (FIG. 1A) when the disk drive is powered on. In yet another embodiment, the control circuitry 18 comprises suitable logic circuitry, such as state machine circuitry.

What is claimed is:

1. A data storage device comprising:
   a volatile memory;
   a primary and a secondary non-volatile memory (NVM);
   control circuitry coupled to the volatile memory and the primary and the secondary NVM;
   wherein the control circuitry is configured to:
      write first data to the volatile memory;
      write the first data from the volatile memory to the secondary NVM before writing the first data to the primary NVM;
      attempt to write the first data to the primary NVM;
   wherein, during the attempt to write the first data to the primary NVM, after a portion of the first data has been successfully written to the primary NVM, a corresponding portion of the first data is released from the secondary NVM,
   wherein the first data is written to the secondary NVM via a first interface and the first data is written to the primary NVM via a second interface, the first interface being slower than the second interface, and
   wherein the portion of the first data is written to N adjacent data sectors of the primary NVM before the corresponding portion of the first data is released from the secondary NVM, wherein N is a number of data sectors on the primary NVM between adjacent servo sectors.

2. The data storage device as recited in claim 1, wherein the primary NVM comprises a plurality of data tracks having a plurality of data sectors and a plurality of servo sectors that provide information usable to confirm the success of writing the portion of the first data.

3. The data storage device as recited in claim 1, wherein the primary NVM comprises a plurality of data tracks and the first data comprises metadata associated with a first data track of the plurality of data tracks.

4. The data storage device as recited in claim 1, wherein the secondary NVM comprises a plurality of memory banks, and wherein the control circuitry is further configured to configure the secondary NVM as a buffer capable of providing real time protection for the N adjacent data sectors of the first data to be written.

5. The data storage device as recited in claim 1, wherein the control circuitry is further configured to configure the secondary NVM as a write-through buffer.

6. The data storage device as recited in claim 1, wherein the control circuitry is further configured to configure the secondary NVM as a write-behind buffer.

7. The data storage device as recited in claim 1, wherein the control circuitry is further configured to:
   store, in the secondary NVM, second data that has been previously written in the primary NVM; and
   if the attempt to write the first data results in corruption of the second data in the primary NVM, restore the corrupted second data in the primary NVM with the second data in the secondary NVM.

8. The data storage device as recited in claim 1, wherein the control circuitry is further configured to:
   detect an unsafe write environment; and
   configure the secondary NVM as a write-behind buffer.

9. The data storage device as recited in claim 8, wherein the unsafe write environment is a shock or high vibration environment.

10. The data storage device as recited in claim 1, wherein the secondary NVM comprises magnetoresistive random-access memory (MRAM).

11. A data storage device comprising:
    a volatile memory;
    a primary and a secondary non-volatile memory;
    control circuitry coupled to the volatile memory and the primary and the secondary non-volatile memory (NVM);
    wherein the control circuitry is configured to:
       write first data to the volatile memory; and
       write the first data from the volatile memory to the secondary NVM and the primary NVM;
       wherein the first and the second NVM comprise a different type of media, and the first data is written to the secondary NVM via a first interface and the first data is written to the primary NVM via a second interface, the first interface being slower than the second interface, and
       wherein the first data is written to N adjacent data sectors of the primary NVM before a corresponding portion of the first data is released from the secondary NVM, wherein N is a number of data sectors on the primary NVM between adjacent servo sectors.

12. The data storage device as recited in claim 11, wherein the control circuitry is further configured to write the first data from the volatile memory to the secondary NVM before writing the first data to the primary NVM.

13. The data storage device as recited in claim 12, wherein the control circuitry is further configured to configure the secondary NVM as a write-behind buffer and a write-through buffer.

14. The data storage device as recited in claim 11, wherein the control circuitry is further configured to write the first data from the volatile memory concurrently to the secondary NVM and the primary NVM.

15. The data storage device as recited in claim 11, wherein the first interface is a serial peripheral interface.

16. The data storage device as recited in claim 11, wherein the secondary NVM comprises first and second memory banks, and wherein the control circuitry is further configured to configure the first and second memory banks as a ping-pong buffer.

17. The data storage device as recited in claim 16, wherein the control circuitry is further configured to configure the ping-pong buffer to bound an average holding time to a predefined limit.

18. The data storage device as recited in claim 16, wherein the secondary NVM comprises first, second, and third memory banks, and wherein the control circuitry is further configured to configure the first and second memory banks as a first type of buffer.

19. The data storage device as recited in claim 18, wherein the control circuitry is further configured to change in real time the first type of buffer to a second type of buffer, and wherein the second type of buffer comprises the third memory bank and one of the first and second memory banks.

20. The data storage device as recited in claim 19, wherein the first type of buffer is a write-through buffer and the second type of buffer is a write-behind buffer.

21. The data storage device as recited in claim 19, wherein the first type of buffer is a write-behind buffer and the second type of buffer is a write-through buffer.

22. A method of operating a data storage device, the data storage device comprising a volatile memory and a primary and a secondary NVM, the method comprising:
   writing first data to the volatile memory;
   writing the first data from the volatile memory to the secondary NVM before writing the first data to the primary NVM;
   attempting to write the first data to the primary NVM;
   wherein, during the attempt to write the first data to the primary NVM, after a portion of the first data has been successfully written to the primary NVM, releasing a corresponding portion of the first data from the secondary NVM,
   wherein the first data is written to the secondary NVM via a first interface and the first data is written to the primary NVM via a second interface, the first interface being slower than the second interface, and
   wherein the portion of the first data is written to N adjacent data sectors of the primary NVM before the corresponding portion of the first data is released from the secondary NVM, wherein N is a number of data sectors on the primary NVM between adjacent servo sectors.

23. The method as recited in claim 22, wherein the secondary NVM comprises a plurality of memory banks, further comprising configuring the secondary NVM as a buffer capable of providing real-time protection for the N adjacent data sectors of the first data to be written.

24. The method as recited in claim 22, further comprising:
   storing, in the secondary NVM, second data that has been previously written in the primary NVM; and
   if the attempt to write the first data results in corruption of the second data in the primary NVM, restoring the corrupted second data in the primary NVM with the second data in the secondary NVM.

25. The method as recited in claim 22, further comprising:
   detecting an unsafe write environment; and
   configuring the secondary NVM as a write-behind buffer.

26. A method of operating a data storage device, the data storage device comprising a volatile memory and a primary and a secondary NVM, the method comprising:
   writing first data to the volatile memory; and
   writing the first data from the volatile memory to the secondary NVM and the primary NVM;
      wherein the first and the second NVM comprise a different type of media, and wherein the first data is written to the secondary NVM via a first interface and the first data is written to the primary NVM via a second interface, the first interface being slower than the second interface, and
   wherein the first data is written to N adjacent data sectors of the primary NVM before a corresponding portion of the first data is released from the secondary NVM, wherein N is a number of data sectors on the primary NVM between adjacent servo sectors.

27. The method as recited in claim 26, further comprising writing the first data from the volatile memory to the secondary NVM before writing the first data to the primary NVM.

28. The method as recited in claim 26, wherein the secondary NVM comprises first and second memory banks, further comprising configuring the first and second memory banks as a ping-pong buffer.

29. The method as recited in claim 28, further comprising configuring the ping-pong buffer to bound an average holding time to a predefined limit.

30. The method as recited in claim 26, wherein the secondary NVM comprises first, second, third memory banks, further comprising configuring the first and second memory banks as a first type of buffer.

31. The method as recited in claim 30, further comprising changing in real-time the first type of buffer to a second type of buffer, and wherein the second type of buffer comprises the third memory bank and one of the first and second memory banks.

\* \* \* \* \*